(12) United States Patent
Park et al.

(10) Patent No.: US 12,118,051 B2
(45) Date of Patent: Oct. 15, 2024

(54) ELECTRONIC DEVICE FOR SEARCHING FOR CONTENT AND METHOD THEREOF

(71) Applicant: Samsung Electronics Co., Ltd., Suwon-si (KR)

(72) Inventors: Jaeseok Park, Suwon-si (KR); Mina Kim, Suwon-si (KR); Seokho Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 18/150,418

(22) Filed: Jan. 5, 2023

(65) Prior Publication Data

US 2023/0177098 A1 Jun. 8, 2023

Related U.S. Application Data

(63) Continuation of application No. PCT/KR2022/015739, filed on Oct. 17, 2022.

(30) Foreign Application Priority Data

Dec. 7, 2021 (KR) .......................... 10-2021-0173951
Dec. 21, 2021 (KR) .......................... 10-2021-0183948

(51) Int. Cl.
*G06F 16/00* (2019.01)
*G06F 3/0482* (2013.01)
(Continued)

(52) U.S. Cl.
CPC .......... *G06F 16/954* (2019.01); *G06F 3/0482* (2013.01); *G06F 16/9537* (2019.01)

(58) Field of Classification Search
CPC ............... G06F 16/954; G06F 16/9537; G06F 3/0482

See application file for complete search history.

(56) References Cited

U.S. PATENT DOCUMENTS

| 7,769,760 B2 | 8/2010 | Watanabe et al. |
| 10,551,998 B2 | 2/2020 | Lee et al. |

(Continued)

FOREIGN PATENT DOCUMENTS

| CN | 108255382 A | 7/2018 |
| JP | 2005-056371 A | 3/2005 |

(Continued)

OTHER PUBLICATIONS

International Search Report dated Feb. 2, 2023, issued in Application No. PCT/KR2022/015739.

*Primary Examiner* — Cheryl Lewis
(74) *Attorney, Agent, or Firm* — Jefferson IP Law, LLP

(57) ABSTRACT

An electronic device is provided. The electronic device includes a display, a communication module, at least one processor operatively connected to the display and the communication module, and a memory operatively connected to the at least one processor, and the memory may store instructions which, when executed, cause the at least one processor to display, on the display, one or more keywords for searching for a content, to arrange and display, according to a designated criterion, one or more first categories among subordinate categories associated with the first keyword and one or more first contents associated with the first keyword, in response to identifying that a first keyword is selected among the one or more keywords, to arrange and display, according to the designated criterion, one or more second categories among subordinate categories associated with a selected category and one or more second contents associated with the selected category in the case that a selection input to one of the one or more first categories is identified, and to provide the selected content in the case that a selection input to one of the one or more first contents is identified.

22 Claims, 12 Drawing Sheets

(51) Int. Cl.
*G06F 16/9537* (2019.01)
*G06F 16/954* (2019.01)

(56) References Cited

U.S. PATENT DOCUMENTS

| | | | |
|---|---|---|---|
| 10,990,623 B2* | 4/2021 | Liu | G06F 16/334 |
| 11,240,361 B2* | 2/2022 | Han | G06F 3/0482 |
| 2014/0207742 A1 | 7/2014 | Chen et al. | |
| 2020/0045163 A1 | 2/2020 | Hwang et al. | |
| 2021/0374195 A1* | 12/2021 | Chen | G06F 16/951 |
| 2022/0046078 A1 | 2/2022 | Andreou et al. | |
| 2022/0382788 A1* | 12/2022 | Lee | G06F 16/955 |
| 2023/0177098 A1* | 6/2023 | Park | G06F 3/0482 |
| | | | 707/706 |
| 2023/0232075 A1* | 7/2023 | Min | G06F 16/48 |
| | | | 725/34 |

FOREIGN PATENT DOCUMENTS

| | | |
|---|---|---|
| JP | 2005-309998 A | 11/2005 |
| JP | 2008123239 A | 5/2008 |
| JP | 2010186295 A | 8/2010 |
| JP | 4910582 B2 | 4/2012 |
| JP | 6116034 B1 | 4/2017 |
| KR | 10-1320022 B1 | 10/2013 |
| KR | 10-2013-0122424 A | 11/2013 |
| KR | 10-2014-0091135 A | 7/2014 |
| KR | 10-2016-0023412 A | 3/2016 |
| KR | 10-2016-0131477 A | 11/2016 |
| KR | 10-2019-0013057 A | 2/2019 |
| KR | 10-2019-0107621 A | 9/2019 |
| KR | 10-2196486 B1 | 12/2020 |
| WO | 2010061535 A1 | 6/2010 |

\* cited by examiner

ELECTRONIC DEVICE FOR SEARCHING FOR CONTENT AND METHOD THEREOF

CROSS-REFERENCE TO RELATED APPLICATION(S)

This application is a continuation application, claiming priority under § 365(c), of an International application No. PCT/KR2022/015739, filed on Oct. 17, 2022, which is based on and claims the benefit of a Korean patent application number 10-2021-0173951, filed on Dec. 7, 2021, in the Korean Intellectual Property Office, and of a Korean patent application number 10-2021-0183948, filed on Dec. 21, 2021, in the Korean Intellectual Property Office, the disclosure of each of which is incorporated by reference herein in its entirety.

TECHNICAL FIELD

The disclosure relates to an electronic device for searching for a content that a user desires to retrieve among contents stored in the electronic device, and a method thereof.

BACKGROUND ART

Due to the development of mobile communication technology, the use of portable terminals has become generalized. Accordingly, services or functions provided via such portable terminals are being gradually diversified. For example, a user may store and manage various types of contents, such as images, videos, documents, or applications, in addition to contact information of others, and may retrieve and use a desired content whenever needed.

The above information is presented as background information only to assist with an understanding of the disclosure. No determination has been made, and no assertion is made, as to whether any of the above might be applicable as prior art with regard to the disclosure.

DISCLOSURE

Technical Problem

Contents stored and managed via portable terminals have been diversified and increased and thus, a user may have difficulty in retrieving a predetermined content desired by the user. Generally, a user may search for a desired content by turning a home screen page of a display, and when the number of contents stored in the portable terminal is high, the time spent in searching for a content may be increased.

Aspects of the disclosure are to address at least the above-mentioned problems and/or disadvantages and to provide at least the advantages described below. Accordingly, an aspect of the disclosure is to provide a scheme of searching for a content by inputting a search word. However, in the case that a search word is not suitable, a desired content may not be retrieved immediately and searching multiple times needs to be performed, which is burdensome.

Another aspect of the disclosure is to provide a scheme of providing a content selected based on a search word which was input in the past in the case that a user reinputs the corresponding search word. However, in the case that a search history associated with a predetermined content is not present, this scheme is unavailable and thus, may not be an efficient content search scheme.

Another aspect of the disclosure is to provide a content navigation model in a tree structure that is produced by hierarchically clustering keywords associated with contents stored in an electronic device.

Another aspect of the disclosure is to provide an electronic device that support a user to easily and quickly retrieve a desired content in the case that the user desires to search for a predetermined content via an electronic device by arranging and displaying a higher category and a content associated therewith based on the produced content navigation, and providing a subordinate category of a category selected by the user and a related content in stages until the user retrieves the desired content.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a display, a communication module, at least one processor operatively connected to the display and the communication module, and a memory operatively connected to the at least one processor, and the memory stores instructions which, when executed, cause the at least one processor to display, on the display, one or more keywords for searching for a content, to arrange and display, according to a designated criterion, one or more first categories among subordinate categories associated with a first keyword and one or more first contents associated with the first keyword in response to identifying that the first keyword is selected, to arrange and display, according to the designated criterion, one or more second categories among subordinate categories associated with a selected category and one or more second contents associated with a selected category in the case that a selection input to one of the one or more first categories is identified, and to provide the selected content in the case that a selection input to one of the one or more first contents is identified.

In accordance with another aspect of the disclosure, an electronic device is provided. The electronic device includes a communication module, at least one processor operatively connected to the communication module, and a memory storing a plurality of contents, and operatively connected to the at least one processor, and the memory may store instructions which, when executed, cause the at least one processor to obtain a plurality of keywords associated with the plurality of contents, to hierarchically classify the plurality of contents based on the plurality of obtained keywords, so as to produce one or more groups, to identify a representative keyword corresponding to each of the one or more groups, to combine the identified representative keyword and a content included in each of the one or more groups so as to produce a navigation model, and to store the produced navigation model.

In accordance with another aspect of the disclosure, a method of operating an electronic device is provided. The method includes an operation of displaying, on a display, one or more keywords for searching for a content, an operation of arranging and displaying, according to a designated criterion, one or more first categories among subordinate categories associated with the first keyword and one or more first contents associated with the first keyword, in response to identifying that a first keyword is selected among the one or more keywords, an operation of arranging and displaying, according to the designated criterion, one or more second categories among the subordinate categories associated with a selected category and one or more second contents associated with the selected category, in the case that a selection input to one of the one or more first categories is identified, and an operation of providing the selected content in the case that a selection input to one of the one or more first contents is identified.

In accordance with another aspect of the disclosure, a method of operating an electronic device is provided. The method includes an operation of obtaining a plurality of keywords associated with a plurality of contents stored in the electronic device, an operation of hierarchically classifying the plurality of contents based on the plurality of obtained keywords, and producing one or more groups, an operation of identifying a representative keyword corresponding to each of the one or more groups, an operation of combining the identified representative keyword and a content included in each of the one or more groups, and producing a navigation model, and an operation of storing the produced navigation model.

Advantageous Effects

According to various embodiments disclosed in the document, contents (e.g., contact information, images, videos, document files, or applications) stored in an electronic device (e.g., a smartphone, a tablet device) can be hierarchically grouped and managed according to a category. In addition, in the case of searching for a content, a category and a content corresponding to each group is suggested in stages based on a selection input from a user, and thus a user can easily and quickly access a desired content and the efficiency of a content search process may be improved.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
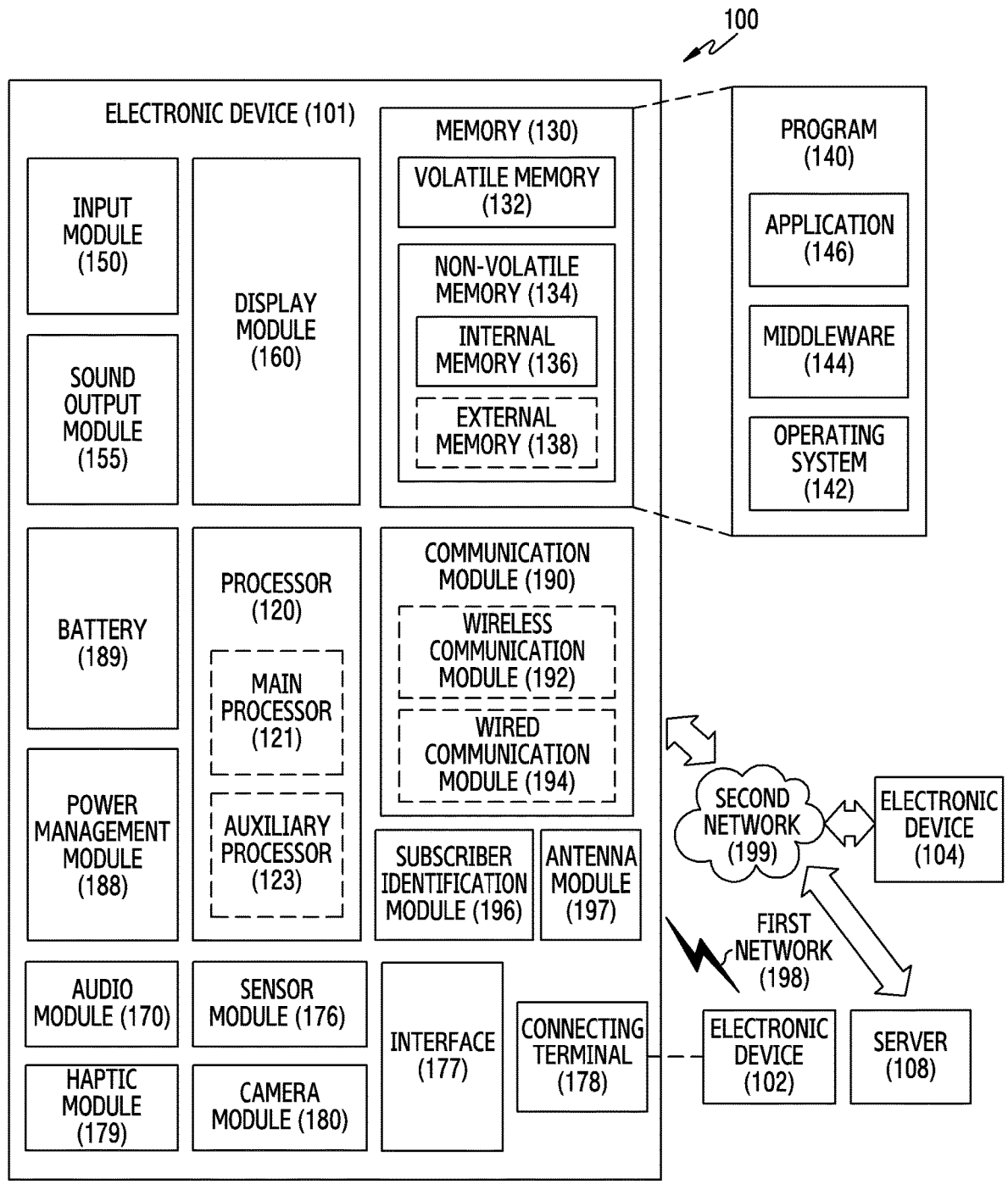
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
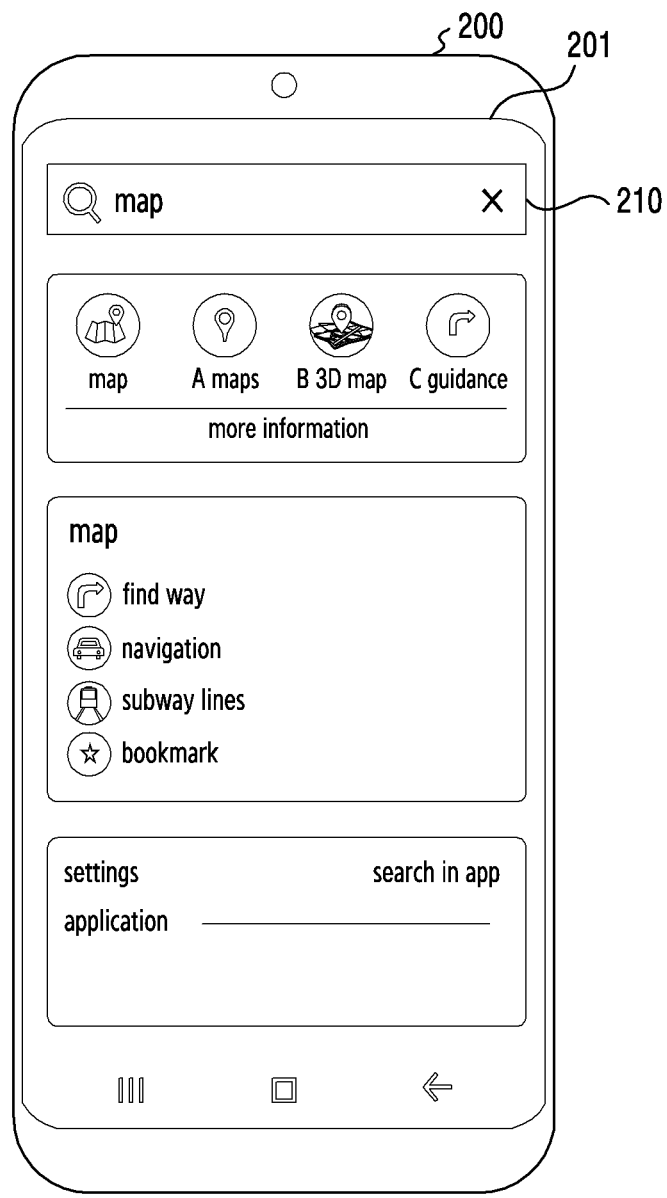
FIG. 2 is a diagram illustrating a content search scheme according to an embodiment of the disclosure.

FIG. 2 is a diagram illustrating a content search scheme according to an embodiment of the disclosure. According to various embodiments of the disclosure, an electronic device 200 may search for a content that a user desires to retrieve based on a search word input by the user.

Referring to FIG. 2, the electronic device 200 may provide a content search screen 201 in response to a designated gesture input. For example, in the case that the user reaches a page for searching for a content while turning home screen pages of the electronic device 200, or in the case that the user detects that a swipe operation is performed in a designated direction on a display, the content search screen 201 may be displayed. As another example, in response to user touch input to a short-cut icon of a home screen or a voice command input to the user, the electronic device 200 may call and display the content search screen 201.

In the comparative example, the content search screen 201 may include a search word input field 210 to receive input of a search word associated with a content that a user desires to retrieve. According to various embodiments of the disclosure, the electronic device 200 may provide a related content based on a search word input to the search word input field 210. For example, in the case that a user inputs a search word of 'map' to the search word input field 210 in the content search screen 201, the electronic device 200 may identify a content related to a map among contents stored in a memory, and may provide the identified result as a search result.

In the comparative example, the electronic device 200 may display, in the lower part of the content search screen 201, one or more applications providing a map service, and an image, a document, or a webpage related to a map, as a search result. According to various embodiments of the disclosure, the electronic device 200 may display map-related functions capable of being provided via the electronic device 200 as a search result. In the case that a content is provided based on a search word as illustrated in FIG. 2, a user needs to input a suitable search word in order to receive a desired content as a search result. In the case that the user does not input a suitable search word corresponding to a content that the user desires to retrieve, the user may fail to retrieve the content and thus, the user may need to repeatedly perform searching until a suitable search word is input.

Figure 3:
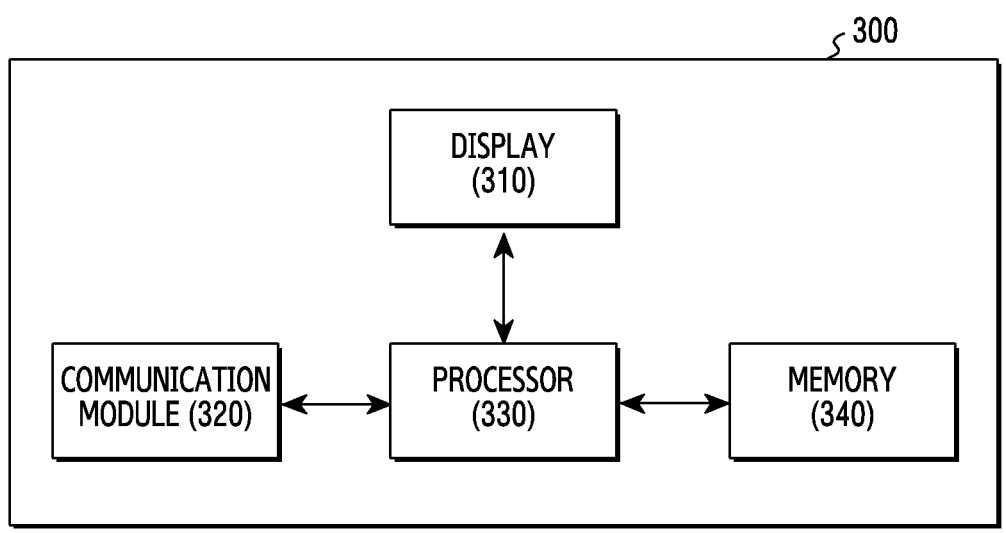
FIG. 3 is a block diagram of a configuration of an electronic device according to an embodiment of the disclosure.

FIG. 3 is a block diagram of a configuration of an electronic device according to an embodiment of the disclosure.

Referring to FIG. 3, an electronic device 300 is a device for navigating in stages so that a user is capable of easily and quickly retrieving a desired content, and may include a display 310, a communication module 320, a processor 330, or a memory 340. In FIG. 3, the electronic device 300 may correspond to the electronic device 101 of FIG. 1.

According to an embodiment of the disclosure, the display 310 (e.g., the display module 160 of FIG. 1) may display a content selected by the user among a plurality of contents stored in the electronic device 300. For example, the display 310 may provide, in stages, a category and a content corresponding to a keyword selected by the user so that the user is capable of accessing a desired content. As another example, the display 310 may display an execution screen of an application for providing a content based on a selection input from the user.

According to an embodiment of the disclosure, the display 310 may include at least one of a liquid crystal display (LCD), a thin film transistor LCD (TFT-LCD), an organic light emitting diodes (OLED), a light emitting diode (LED), an active matrix organic LED (AMOLED), a flexible display, and a three dimension display (3 dimension display). In addition, some of the displays may be configured in a transparent type or a light transmission type so that the outside can be seen therethrough. The display may be implemented in a transparent display form including a transparent OLED (TOLED).

According to an embodiment of the disclosure, the communication module 320 (e.g., the communication module 190 of FIG. 1) may set up a communication connection with one or more external electronic devices (e.g., the electronic device 102 or the electronic device 104 of FIG. 1) or an external server (e.g., the server 108 of FIG. 1). For example, the communication module 320 may obtain, from the external server, various types of contents and keywords related thereto or the initial data of a content navigation model. As another example, the communication module 320 may transmit, to the external server, data related to the content navigation model produced by the electronic device 300. According to various embodiments of the disclosure, the communication module 320 may provide at least one communication scheme among cellular communication, wireless-fidelity (Wi-Fi), Bluetooth, near field communication (NFC), or ultra-wideband (UWB).

According to an embodiment of the disclosure, the memory 340 (e.g., the memory 130 of FIG. 1) may store a plurality of contents produced directly in the electronic device 300 by a user or obtained from an external electronic device via the communication module 320, and information related to each content. The plurality of contents may include various types of contents, such as contact information of others managed in the electronic device 300, messages or e-mails exchanged with other users, images, videos, application or document files, or the like. According to various embodiments of the disclosure, the memory 340 may store instructions which, when executed, control at least one processor 330 (e.g., the processor 120 of FIG. 1) to perform various operations. For example, the at least one processor 330 may execute operations for suggesting one or more categories and related contents in stages so as to enable a user to access a desired content among contents stored in the electronic device 300.

According to various embodiments of the disclosure, the at least one processor 330 may perform operations for producing a content navigation model for hierarchically grouping and managing a plurality of contents based on one or more related keywords so that a user efficiently search for a predetermined content among the plurality of contents stored in the memory 340.

According to an embodiment of the disclosure, the at least one processor 330 may obtain a plurality of keywords associated with the plurality of contents stored in the memory 340. The plurality of keywords may be obtained using at least one of the name (e.g., a file name, an application name) or the type of each content, related information (e.g., a category, metadata or tag data), or the contents included in a content. For example, the at least one processor 330 may identify information related to the plurality of contents from one or more databases accessible by the memory 340 or the electronic device 300. The at least one processor 330 may extract the plurality of keywords based on the identified information associated with the plurality of contents. As another example, the at least one processor 330 may obtain information related to the plurality of contents from an external server via the communication module 340, or may obtain a recommended keyword associated with the plurality of contents. According to various embodiments of the disclosure, the at least one processor 330 may identify the plurality of keywords in response to identifying that a new content is stored in the memory 340 or at regular time intervals.

According to an embodiment of the disclosure, the at least one processor 330 may hierarchically classify the plurality of contents based on the plurality of keywords, and may produce one or more groups. The at least one processor 330 may classify the plurality of contents in the form of a hierarchical tree structure using a hierarchical clustering scheme, and may produce one or more groups based on a classification result.

According to an embodiment of the disclosure, the at least one processor 330 may identify representative keywords corresponding to the one or more produced groups. A representative keyword for each group may correspond to a category corresponding to each of the one or more groups produced according to the classification result. According to various embodiments of the disclosure, the at least one processor 330 may determine a representative keyword for each group based on at least one of an average similarity between contents included in each of the one or more groups, a keyword type, or a search history. For example, the at least one processor 330 may calculate similarity between contents associated with each group, and may determine the keyword of a content having the highest average value of the calculated similarities as a representative keyword of the corresponding group. The similarity between contents may be measured using at least one text-based similarity calculation scheme among a cosine similarity, the Jaccard coefficient, a correlation coefficient, or Hamming distance. As another example, at least one processor 330 may set a weight value for each of source data associated with keywords included in each group, and may calculate a keyword score based on the set weight value. The at least one processor 330 may determine a keyword having the highest calculated keyword score as the representative keyword. As another example, the at least one processor 330 may identify the frequency of use of the keywords included in each group, and may determine a keyword having the highest frequency of use as the representative keyword.

According to an embodiment of the disclosure, the at least one processor 330 may produce a navigation model by combining a representative keyword identified for each group and a content associated with each group. For example, the at least one processor 330 may produce a navigation model in a hierarchical tree structure by associating the plurality of contents with the representative keyword for each group so as to correspond to one or more groups produced based on hierarchical clustering. According to the structure of the navigation model, each content is not specified for a single keyword and may be overlappingly connected to one or more keywords according to an association with one or more categories. Accordingly, the probability that a user will access a desired content is increased.

According to various embodiment of the disclosure, to provide a customized search result suitable for the situation at the point in time of searching for a content, the at least one processor 330 may produce a content navigation model in real time based on a user profile or context information or may produce a content navigation model for each of the various contexts. For example, the at least one processor 330 may identify context information associated with a user, and may set a weight value for at least one keyword related to the identified context information. The context information may include at least one of a location, a season, a date, a time, or weather. For example, in the case that a user desires to search for a predetermined content while the user is located in an amusement park, the at least one processor 330 may identify a context of 'amusement park', and may set a weight value for a keyword related to the context of 'amusement park' or a weight value for a keyword related to a content that has a usage history in the corresponding context so that the user is capable of quickly accessing an application related to an amusement park or surrounding facilities related information. The at least one processor 330 may determine a representative keyword for each group based on the set weight value, and may produce a navigation model corresponding to the context information based on the determined representative keyword for each group.

According to various embodiments of the disclosure, the at least one processor 330 may automatically produce a folder in a home screen (or a wallpaper) of the electronic device 300 based on the navigation model. For example, in the case that the user inputs the number of desired folder(s), the at least one processor 330 may extract, from the navigation model, as many groups as the number of folder(s) that is input, and may produce folder(s) using a representative keyword for each extracted group. According to various embodiments of the disclosure, the at least one processor 330 may produce a folder for each context based on a navigation model produced for each context. In this instance, the at least one processor 330 may provide a folder structure corresponding to user context and thus, the user is capable of quickly retrieving a desired content.

According to an embodiment of the disclosure, the at least one processor 330 may store the produced navigation model in a database that the memory 340 or the electronic device 300 is capable of accessing. According to various embodiments of the disclosure, the at least one processor 330 may update the navigation model every time a content is stored. For example, in the case that a new content is identified as being stored in the memory 340, the at least one processor 330 may obtain at least one keyword associated with the new content, and may update the navigation model in a manner that applies the new content to the existing navigation model by utilizing an incremental clustering scheme.

According to various embodiments of the disclosure, the at least one processor 330 may perform operations that provide, in stages based on a content navigation model, a path to access a content that the user desires to retrieve.

According to an embodiment of the disclosure, the at least one processor 330 may display, on the display 310, one or more keywords for searching for a content. The one or more keywords may correspond to representative keywords of groups classified as the uppermost category in the content navigation model. In response to a designated gesture input from a user, the at least one processor 330 may display the one or more keywords on the display 310. For example, in the case that a user touch input or voice command to call a content search screen is identified as being input, the at least one processor 330 may display the one or more keywords on the display 310. In addition, in the case that a designated action for searching for a content is identified as being performed, the at least one processor 330 may suggest the one or more keywords via the display 310.

According to an embodiment of the disclosure, the at least one processor 330 may identify that a first keyword is selected among the one or more keywords displayed on the display 310. For example, the at least one processor 330 may identify that the first keyword is selected based on a user touch input or voice input to the first keyword.

According to an embodiment of the disclosure, the at least one processor 330 may display, on the display 310, one or more first categories among subordinate categories associated with the first keyword and one or more first contents associated with the first keyword. The one or more first categories may correspond to at least some of the subordinate categories of the first keyword, and a representative keyword for each group classified as a subordinate category of the first keyword in the content navigation model may be displayed as the one or more first categories. The one or more first contents may include a content belonging to a group corresponding to the first keyword. For example, in response to identifying that a keyword of 'travel' is selected among the one or more keywords, the at least one processor 330 may display, on the display 310, a category of 'flight', 'map', 'food', or 'accommodation' and one or more contents associated with 'travel'. According to various embodiments of the disclosure, the at least one processor 330 may identify content display-related setting information in response to a selection input to the first keyword. For example, the at least one processor 330 may identify, based on the setting information, the number of items capable of being displayed, and may limit the number of one or more first categories and the one or more first contents to the number of items capable of being displayed. In this instance, the at least one processor 330 may select first categories and first contents, the number of each of which corresponds to the number of items capable of being displayed according to at least one criterion among similarity to the first keyword, the frequency of search, or a content production time, and may display the same on the display 310. In the case that it is assumed that the number of items capable of being displayed is set to 4, the at least one processor 330 may display top 4 categories having high similarity to the first keyword among one or more first categories belonging to the subordinate categories of the first keyword, and top 4 contents having high similarity to the first keyword among one or more first contents associated with the first keyword. A criterion to select a category or a content to be displayed on the display 310 may be applied differently based on the content usage pattern of a user.

According to various embodiments of the disclosure, the number of items capable of being displayed may be set to be differently for each of a category and a content. For example, in the case that the number of categories capable of being displayed is set to 3, the at least one processor 330 may arrange, in order of highest frequency of search, top 3 categories having high frequency of search among the one or more first categories that belong to the subordinate categories of the first keyword, and display the same. As another example, in the case that the number of contents capable of being displayed is set to 5, the at least one processor 330 may arrange, in order of content production time, 5 contents that are latest produced among the one or more first contents associated with the first keyword, and may display the same.

According to an embodiment of the disclosure, the at least one processor 330 may identify a selection input with respect to the one or more first categories or the one or more first contents. Based on a user touch input or voice input, or other designated gesture inputs, the at least one processor 330 may identify which of the items is selected among the one or more first categories or the one or more first contents. For example, in the case that a selection input to one of the one or more first contents is identified, the at least one processor 330 may provide the selected content via the display 310. In response to the selection of the content, the at least one processor 330 may identify an application or a program needed for providing the content, may execute the same, and may provide the selected content.

As another example, in the case that a selection input to one of the one or more first categories is identified, the at least one processor 330 may display, on the display 310, one or more second categories among subordinate categories associated with the selected category and one or more second contents associated with the selected category. The one or more second categories may correspond to at least some of the subordinate categories of the first category, and a representative keyword for each group classified as a subordinate category of the selected category in the content navigation model may be displayed as one or more second categories. The one or more second contents may include a content belonging to a group of the selected category. The at least one processor 330 may display the one or more second categories and one or more second contents in the same manner of displaying the one or more first categories and the one or more first contents. In the case that one of the one or more first categories is identified as being selected, the at least one processor 330 may identify the number of items capable of being displayed according to the setting information, may select and arrange second categories and second contents, the number of each of which corresponds to the number of items capable of being displayed according to at least one criterion among similarity to a representative keyword of the selected category, the frequency of search, a content production time, and may display the same on the display 310.

According to an embodiment of the disclosure, the at least one processor 330 may identify a selection input with respect to the one or more second categories or the one or more second contents. Based on a user touch input or voice input, or other designated gesture inputs, the at least one processor 330 may identify which of the items is selected among the one or more second categories or the one or more second contents. For example, in the case that a selection input to one of the one or more second contents is identified, the at least one processor 330 may provide the selected content via the display 310. As another example, in the case that a selection input to one of the one or more second categories is identified, the at least one processor 330 may display one or more categories associated with the selected category and one or more contents on the display 310. The at least one processor 330 may identify one or more subordinate categories associated with the selected category and one or more contents and may display the same on the display 310 until selection of any one of the contents displayed on the display 310 is input.

According to an embodiment of the disclosure, the at least one processor 330 may display one or more categories and one or more contents based on user profile or context information at the point in time of searching for a content. For example, in the case that a selection input to the first keyword is identified, the at least one processor 330 may identify context information at the point in time at which the selection input is provided. The context information may include at least one of a location, a season, a date, a time, or weather. The at least one processor 330 may set a weight value for a keyword related to the identified context or a keyword related to a content having a search history (or usage history) in the context, may determine the one or more first categories and the one or more first contents based on the set weight value, and may process the category or content related to the context to be displayed earlier than other items.

Figure 4:
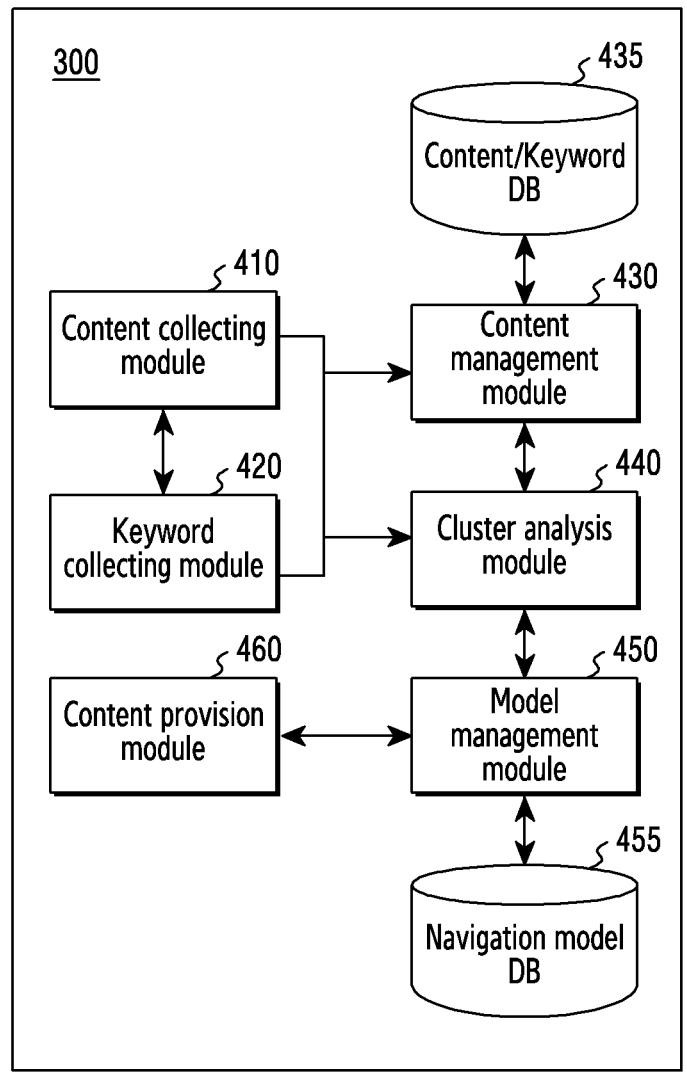
FIG. 4 is a diagram illustrating a detailed configuration of an electronic device according to an embodiment of the disclosure.

FIG. 4 is a diagram illustrating a detailed configuration of an electronic device according to an embodiment of the disclosure. Operations or functions described with reference to FIG. 4 may be understood as a function performed by at least one processor 330 of the electronic device 300 of FIG. 3. The at least one processor 330 may execute instructions stored in the memory 340 in order to embody software modules illustrated in FIG. 4, and may control hardware associated with a function (e.g., the display 310, the communication module 320, or the memory 340 of FIG. 3). According to various embodiments of the disclosure, the electronic device 300 is not limited to the elements illustrated in FIG. 4, and may further include an element corresponding to a function required from the electronic device 300 among the elements illustrated in FIG. 1.

Referring to FIG. 4, the electronic device 300 may include a content collecting module 410, a keyword collecting module 420, a content management module 430, a content/keyword database (DB) 435, a cluster analysis module 440, a model management module 450, a navigation model DB 455, or a content provision module 460.

According to an embodiment of the disclosure, the content collecting module 410 may collect information related to a plurality of contents stored in the memory (e.g., the memory 130 of FIG. 1 or the memory 340 of FIG. 3) of the electronic device 300. The plurality of contents may correspond to all objects stored in the memory 340, and may include various types of contents, such as contact information of others managed in the electronic device 300, messages or e-mails exchanged with other users, images, videos, application or document files, or the like. For example, the content collecting module 410 may identify content related information from the plurality of contents. The content related information may include at least one of the name (e.g., a file name or an application name) or type of a content, a related category, meta information or tag information. As another example, the content collecting module 410 may obtain the content related information from an external electronic device (e.g., the electronic device 102 or 104 of FIG. 1) or an external server (e.g., the server 108 of FIG. 1) using the communication module (e.g., the communication module 190 of FIG. 1 or the communication module 320 of FIG. 3) of the electronic device 300. According to various embodiments of the disclosure, the content collecting module 410 may obtain the content related information when a new content is stored or at regular time intervals.

According to an embodiment of the disclosure, the keyword collecting module 420 may collect keywords associated with the plurality of contents. For example, the keyword collecting module 420 may obtain content related information associated with the plurality of contents from the content collecting module 410, and may extract a plurality of keywords from the content related information. The plurality of keywords may be obtained from at least one from among keywords that were used in a previous search process, a keyword describing a content, or the contents included in a content, in addition to the content related information. The keyword collecting module 420 may collect a keyword using a different scheme based on the type of content. In the case of a content including text therein, such as contact information or message, an application, a document file, or the like, a keyword may be collected from the name (title) or the descriptions of the content. In the case of a content excluding text therefrom, such as an image, a video, or the like, a keyword may be collected via additional analysis on metadata or tag data of the content. As another example, the keyword collecting module 420 may obtain a recommended keyword associated with the plurality of contents from the external electronic device or from the external server using the communication module 320. According to various embodiments of the disclosure, the keyword collecting module 420 may obtain the keywords when a new content is stored or at regular time intervals.

According to an embodiment of the disclosure, the content management module 430 may manage the collected keywords by associating the collected keywords with the plurality of contents. The content management module 430 may combine the collected keywords and contents respectively associated with the keywords, and may store the same in the content/keyword DB 435. According to various embodiments of the disclosure, the content management module 430 may extend the range of a keyword by utilizing a relational database or ontology, and may store and manage associated keywords and contents.

According to an embodiment of the disclosure, the cluster analysis module 440 may perform hierarchical clustering of the contents using keywords stored in the content/keyword DB 435, and may produce a cluster model in a hierarchical tree structure. According to various embodiments of the disclosure, the cluster analysis module 440 may hierarchically classify a plurality of contents stored in the content/keyword DB 435 into groups. The cluster analysis module 440 may produce one or more groups corresponding to the hierarchical classification result. According to various embodiments of the disclosure, the cluster analysis module 440 may perform clustering on a new content every time that a new content is stored or at regular intervals. In this instance, the cluster analysis module 440 may perform clustering on new contents using an incremental clustering scheme, and may perform updating by applying the performance result to the existing cluster model.

According to an embodiment of the disclosure, the model management module 450 may determine a representative keyword corresponding to each of the one or more produced groups. The model management module 450 may determine a representative keyword for each group based on at least one of an average similarity between contents associated with each group, the type of keyword, or a search history. For example, the model management module 450 may calculate similarity between contents included in each group, and may determine the keyword of a content having the highest average value of the calculated similarities as a representative keyword of the corresponding group. The model management module 450 may calculate the similarity between contents using cosine similarity as shown in Equation 1 below.

$$S(a, b) = \frac{\sum_{k=1}^{n} a_i b_i}{\sqrt{\sum_{k=1}^{n} a_i^2} \times \sqrt{\sum_{k=1}^{n} b_i^2}} \quad \text{Equation 1}$$

In Equation 1, each of a and b denotes a content, and S(a,b) denotes the similarity between content a and content b. $a_i$ denotes an $i^{th}$ keyword related to content a, and $b_i$ denotes an $i^{th}$ keyword related to content b. The model management module 450 may calculate similarity between contents for each group using a text-based similarity calculation scheme, such as the Jaccard coefficient, a correlation coefficient, or Hamming distance, in addition to the cosine similarity.

As another example, the model management module 450 may set a weight value for each source data associated with a keyword of contents included in each group, may calculate a keyword score, and may determine a keyword having the highest calculated keyword score as the representative keyword. As another example, the model management module 450 may identify the frequency of use of the contents included in each group, and may determine a keyword associated with a content having the highest frequency of use as the representative keyword.

According to an embodiment of the disclosure, the model management module 450 may produce a navigation model by combining a representative keyword determined for each group and a content included in each corresponding group. The model management module 450 may produce a navigation model in a hierarchical tree structure by associating a content belonging to each group to a representative keyword of each of the one or more groups hierarchically classified based on the cluster model produced by the cluster analysis module 440. The model management module 450 may store and manage the produced navigation model in the navigation model DB 455.

According to an embodiment of the disclosure, based on the navigation model stored in the navigation model DB 455, the content provision module 460 may provide a process of accessing a content that a user desires. The content provision module 460 may suggest suitable categories and contents in stages so that the user is capable of easily and quickly retrieving a desired content. For example, the content provision module 460 may output a content search screen on a display (e.g., the display module 160 of FIG. 1 or the display 310 of FIG. 3) in response to a user touch input or voice command, or a designated gesture input that calls a content search screen. The content search screen may include one or more keywords at the initial stage. The one or more keywords may correspond to representative keywords of groups classified as the uppermost category in the navigation model. In the case that a first keyword is identified as being selected among the one or more keywords, the content provision module 460 may display, on the content search screen, the one or more first categories among subordinate categories associated with the first keyword, and one or more first contents associated with the first keyword. The one or more first categories may include at least some of the subordinate categories of the first keyword, and a representative keyword for each group classified as a subordinate category of the first keyword in the navigation model may be displayed as a first category. The one or more first contents may be a content belonging to a group of the first keyword. According to various embodiments of the disclosure, based on setting information, the content provision module 460 may limit the number of categories and contents to be displayed at the same time. In this instance, the content provision module 460 may select a predetermined number of first categories and a predetermined number of first contents according to the setting information, and may display the same on the content search screen. For example, the content provision module 460 may select a predetermined number of first categories in order of high similarity to the first keyword among the one or more first categories belonging to the subordinate categories of the first keyword, may arrange the selected first categories based on the similarities, and may display the same. In the same manner, the content provision module 460 may select a predetermined number of first contents in order of high similarity to the first keyword among the one or more first contents associated with the first keyword, may arrange the selected contents based on the similarities, and may display the same together with the selected categories. As another example, the content provision module 460 may select and arrange a predetermined number of first categories and a predetermined number of first contents based on the frequency of search or a content production time. The predetermined number of categories and the predetermined number of contents may be set to be the same or different from each other. The criterion to select the first category and/or the first content may be applied differently based on the content usage pattern of a user.

According to an embodiment of the disclosure, the content provision module 460 may repeatedly provide one or more subordinate categories associated with a category selected by a user and one or more contents until selection of any one of the contents is input in the content search screen. For example, in the case that a selection input to one of the one or more categories displayed on the content search screen is identified, the content provision module 460 may display, on the content search screen, one or more subordinate categories associated with the selected category and one or more contents. As another example, in the case that a selection input to one of the one or more contents displayed on the content search screen is identified, the content provision module 460 may provide the selected content, and may terminate a content search process.

Figure 5:
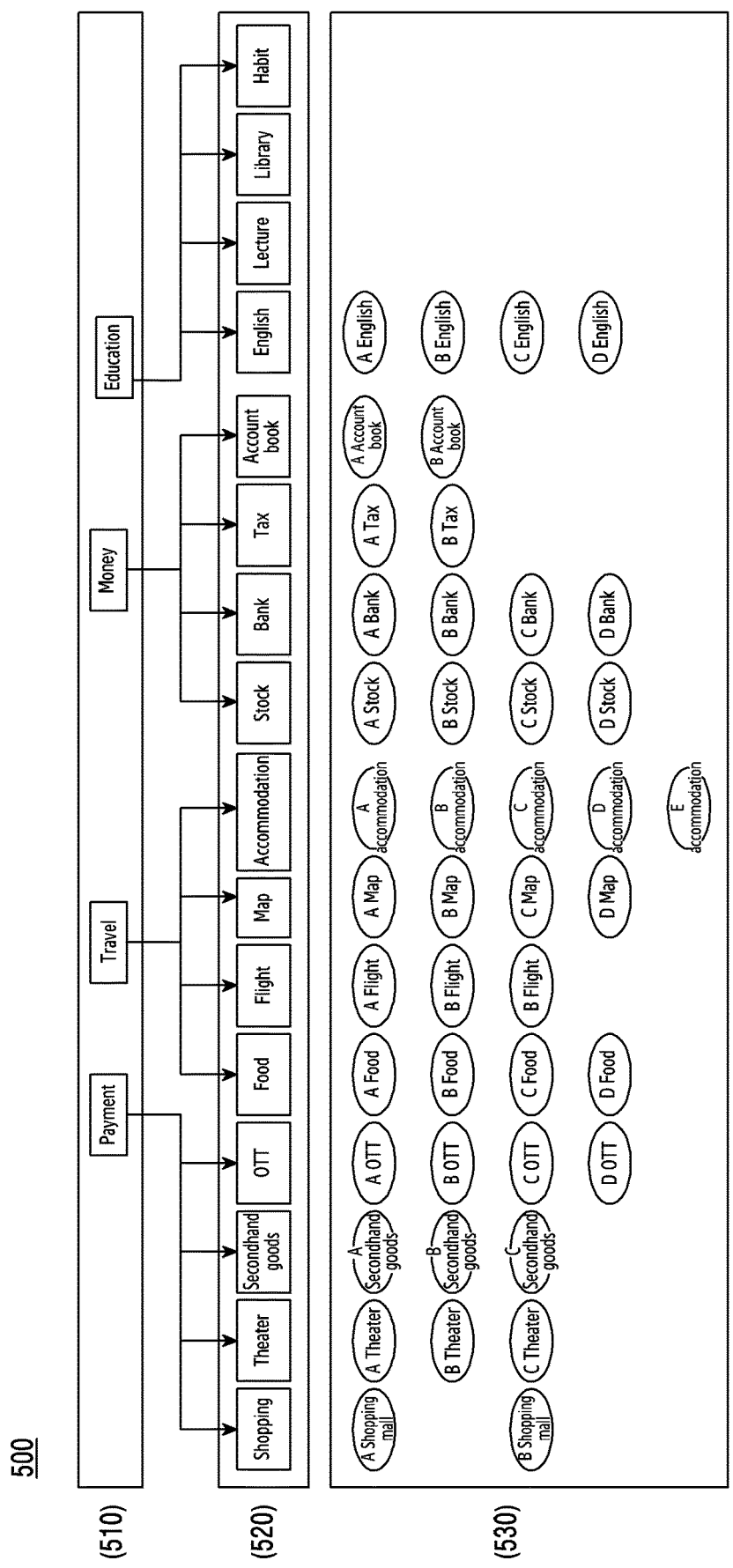
FIG. 5 is a diagram illustrating a produced content navigation model according to an embodiment of the disclosure.

FIG. 5 is a diagram illustrating a produced content navigation model according to an embodiment of the disclosure. According to various embodiments of the disclosure, the electronic device 300 may produce a content navigation model 500 in a hierarchical tree structure as shown in FIG. 5 by hierarchically classifying, based on a related keyword, a plurality of contents stored in a memory (e.g., the memory 130 of FIG. 1, or the memory 340 of FIG. 3).

According to an embodiment of the disclosure, the electronic device 300 may obtain a plurality of keywords associated with the plurality of contents, and may perform hierarchical clustering on the plurality of contents using the plurality of obtained keywords. The electronic device 300 may hierarchically classify the plurality of contents into groups. The electronic device 300 may produce the content navigation model 500 by combining a representative keyword of each group and a content associated with each group.

Referring to FIG. 5, the content navigation model 500 may include groups classified into a plurality of layers, and contents corresponding to respective groups. In the case that hierarchical clustering is performed on the plurality of contents, the plurality of contents may be divided as groups corresponding to a uppermost category 510 and groups corresponding to a subordinate category 520 classified from the uppermost category groups. For example, the electronic device 300 may classify 4 groups including 'payment', 'travel', 'money', and 'education' as the uppermost category 510, and the representative keyword of each of the 4 groups corresponding to the uppermost category 510 may be displayed on the initial screen when a content search process is initiated. Each of the groups classified as the uppermost category 510 may include one or more subordinate categories 520. Although, in the case of the subordinate category 520 of FIG. 5, it is illustrated that one or more groups constitute a single layer, the subordinate category 520 may include groups classified as a plurality of layers according to various embodiments. While the content search process is performed, the electronic device 300 may provide one or more subordinate categories associated with a keyword selected by a user in stages according to the layer structure of the subordinate category 520. For example, in the case that 'education' is selected among 4 keywords displayed on the content search screen, the electronic device 300 may display 'English', 'lecture', 'library', or 'habit' as representative keywords of the groups belonging to the subordinate category of the keyword 'education'. Subsequently, in the case that 'English' is selected from the subordinate categories of the keyword 'education', the electronic device 300 may display one or more subordinate categories associated with 'English' and one or more contents.

According to an embodiment of the disclosure, the content navigation model 500 may include contents 530 corresponding to respective groups of the categories classified into a plurality of layers. The electronic device 300 may associate the plurality of contents with a representative keyword for each group and may store the same in the content navigation model 500. According to various embodiments of the disclosure, each content is not subordinate to a single category (or keyword) and may be overlappingly connected to one or more categories (or keywords) according to an association among one or more categories. While the content search process is performed, the electronic device 300 may display one or more contents associated with a category selected by a user, together with one or more subordinate categories.

Figure 6:
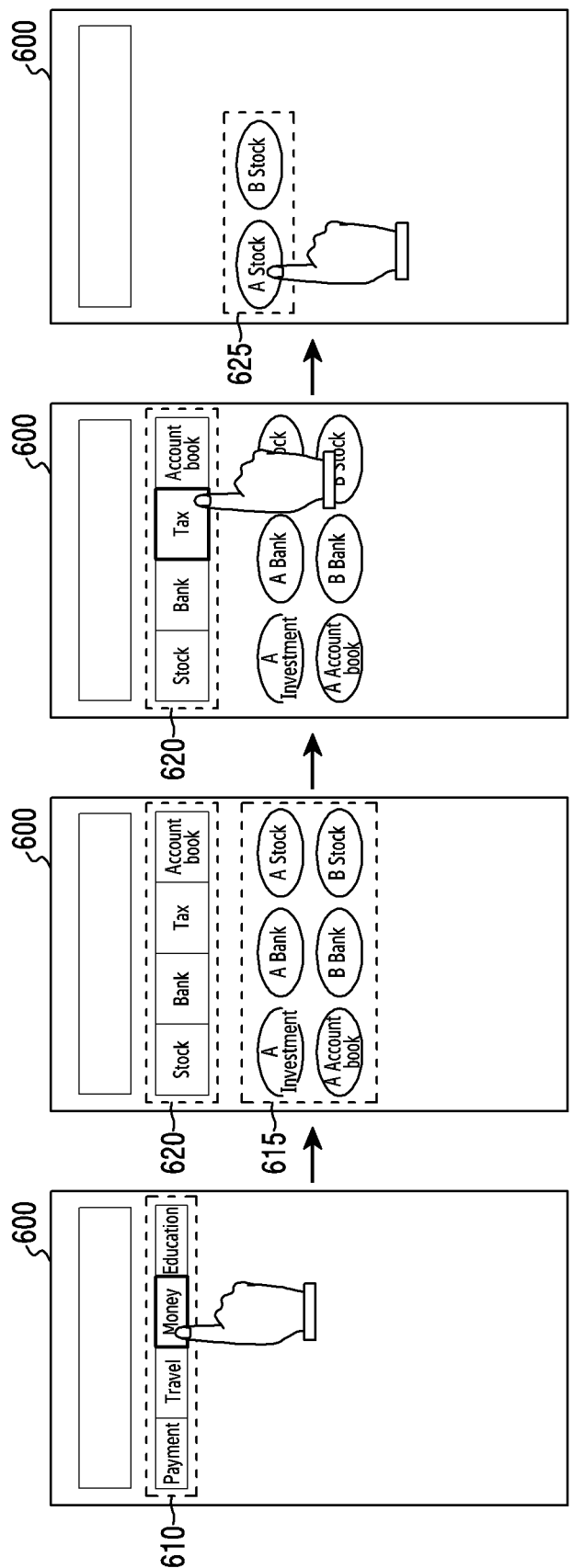
FIG. 6 is a diagram illustrating a scheme of searching for a content in stages in an electronic device according to an embodiment of the disclosure.

FIG. 6 is a diagram illustrating a scheme of searching for a content in stages in an electronic device according to an embodiment of the disclosure. According to various embodiments of the disclosure, the electronic device 300 may initiate a content search process in response to a user touch input or voice command, or a designated gesture input, and may display a content search screen 600 on a display (e.g., the display module 160 of FIG. 1 or the display 310 of FIG. 3).

Referring to FIG. 6, the electronic device 300 may suggest one or more keywords 610 on the content search screen 600 at the initial stage. The one or more keywords 610 may correspond to representative keywords of groups classified as the uppermost category in a content navigation model (e.g., the content navigation model 500 of FIG. 5). For example, the electronic device 300 may display 4 keywords including 'payment', 'travel', 'money', and 'education' classified as the uppermost category on the content search screen 600.

According to an embodiment of the disclosure, the electronic device 300 may identify that 'money' is selected among the one or more keywords 610 suggested via the content search screen 600, and may identify one or more subordinate categories associated with a category group of 'money' and one or more contents from the content navigation model. According to various embodiments of the disclosure, the electronic device 300 may limit the number of subordinate categories and contents to be displayed on the content search screen 600 in response to selection of a predetermined keyword. For example, based on the number of items capable of being displayed set by a user, the electronic device 300 may select and display a predetermined number of categories and/or contents among the identified one or more subordinate categories and one or more contents. The electronic device 300 may select the predetermined number of categories and/or contents according to at least one criterion among similarity to the selected keyword, the frequency of search, or a content production time.

According to an embodiment of the disclosure, in response to selection of a keyword of 'money', the electronic device 300 may display one or more subordinate categories 620 associated with 'money' and one or more contents 615 on the content search screen 600. For example, the electronic device 300 may display 'stock', 'bank', 'tax', or 'account book' as subordinate categories of the keyword 'money', and may display 'A investment', 'A bank', 'A stock', 'A account book', 'B bank', or 'B stock' as contents associated with 'money'. In this instance, the one or more categories 620 may correspond to representative keywords of groups classified as subordinate categories of the keyword 'money'. The one or more contents 615 may include various types of contents, such as contact information of others managed in the electronic device 300, messages or e-mails exchanged with other users, images, videos, application or document files, or the like. According to various embodiments of the disclosure, the electronic device 300 may arrange one or more contents in order of high similarity to a corresponding category and may display the same on the content search screen 600.

According to an embodiment of the disclosure, the electronic device 300 may identify that 'tax' is selected among the one or more subordinate categories 620 suggested via the content search screen 600, and may identify one or more subordinate categories associated with a group of 'tax' and one or more contents from the content navigation model. In the case that a subordinate category associated with 'tax' is identified as not being present, the electronic device 300 may not display a subordinate category and may display only one or more contents 625 associated with 'tax' on the content search screen 600. For example, the electronic device 300 may display tax A or tax B as contents associated with 'tax' in response to selection of the category of 'tax'.

According to an embodiment of the disclosure, in the case that tax A is identified as being selected among the one or more contents 625 via the content search screen 600, the electronic device 300 may provide the content of tax A selected. In the case that the selected content is an application, the electronic device 300 may provide the execution screen of the corresponding application via the display. In the case that the selected content is a content of a type different from an application, the electronic device 300 may identify an application or program needed for providing the corresponding content, may execute the same, and may provide the selected content.

Figure 7:
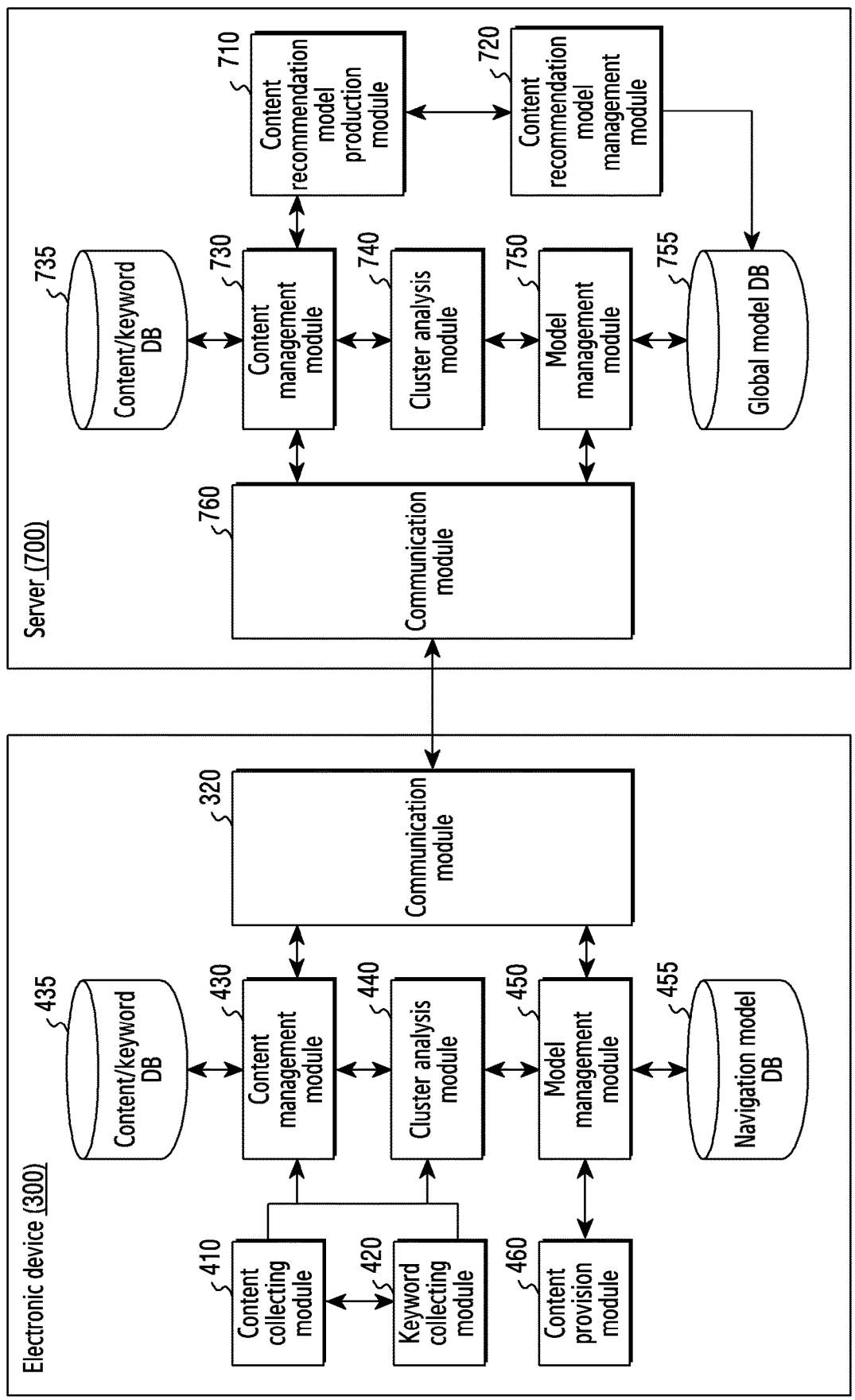
FIG. 7 is a diagram illustrating a configuration of providing a content navigation model by interoperating with an external server according to an embodiment of the disclosure.

FIG. 7 is a diagram illustrating a configuration of providing a content navigation model by interoperating with an external server according to an embodiment of the disclosure. According to various embodiments of the disclosure, in order to collect various types of information and to efficiently perform management, the electronic device 300 may transmit or receive a content navigation model-related data based on communication with an external server (e.g., the server 108 of FIG. 1). In FIG. 7, the electronic device 300 may correspond to the electronic device 300 illustrated in FIGS. 3 and 4, and descriptions related to component modules (e.g., the content collecting module 410, the keyword collecting module 420, the content management module 430, the content/keyword DB 435, the cluster analysis module 440, the model management module 450, the navigation model DB 455, or the content provision module 460) included in the electronic device 300 of FIG. 4 may be equally applied to the electronic device 300 of FIG. 7. The electronic device 300 may further include the communication module 320 for a communication connection with a server 700, in addition to the component module illustrated in FIG. 4. The communication module 320 may correspond to the communication module 190 of FIG. 1 or the communication module 320 of FIG. 3. As illustrated, the communication module 320 may set up a communication connection with the server 700 and may obtain various types of contents and keywords related thereto, or initial data of a content navigation model from the server 700, or may transmit content navigation model-related data produced by the electronic device 300 to the server 700.

Referring to FIG. 7, the server 700 may include a content recommendation model production module 710, a content recommendation model management module 720, a content management module 730, a content/keyword DB 735, a cluster analysis module 740, a model management module 750, a global model DB 755, or a communication module 760. According to various embodiments of the disclosure, the server 700 is not limited to the elements illustrated in FIG. 7, and may further include an element corresponding to a function required from the server 700 among the elements illustrated in FIG. 1.

According to an embodiment of the disclosure, the content recommendation model production module 710 is a component for recommending a content that a large number of users use, in addition to a keyword related to a content stored in the electronic device 300 that an individual uses, and may produce a content recommendation model based on content and/or related keyword information obtained from one or more electronic devices 300 connected to the server 700.

According to an embodiment of the disclosure, the content recommendation model management module 720 may manage the produced content recommendation model. For example, the content recommendation model management module 720 may update the content recommendation model when introduction of new data is identified or at regular time intervals, and may recommend a suitable content that is not stored in the electronic device 300.

According to an embodiment of the disclosure, the content management module 730 may perform management by associating each content included in the content recommendation model with one or more related keywords. The content management module 730 may identify one or more keywords associated with each content, may combine the one or more keywords and each content, and may store the same in the content/keyword DB 735. According to various embodiments of the disclosure, the content management module 730 may extend the range of a keyword by utilizing a relational database or ontology, and may store and manage associated keywords and contents.

According to an embodiment of the disclosure, the cluster analysis module 740 may perform hierarchical clustering of the contents stored in the content/keyword DB 735, and may produce a cluster model in a hierarchical tree structure. According to various embodiments of the disclosure, the cluster analysis module 740 may hierarchically classify, using the keywords, contents stored in the content/keyword DB 735 into groups.

According to an embodiment of the disclosure, the model management module 750 may produce a global model by combining keywords for each group hierarchical classified according to a clustering result and contents belonging to each group. Unlike a content navigation model personalized for a predetermined user, the global model may be understood as an integrated model based on contents (or keywords) that are frequently used in common. The model management module 750 may store and manage the produced global model in the global model DB 755. According to various embodiments of the disclosure, the model management module 750 may produce and manage the global model by combining content navigation models produced by the electronic devices 300 of many users, and the server 700 may provide the produced global model to each electronic device 300.

According to an embodiment of the disclosure, the communication module 760 may set up a communication connection with one or more electronic devices 300, may transmit a recommended content and a related keyword, or the initial data of a content navigation model to the electronic device 300, or may receive, from the electronic device 300, content navigation model-related data produced in the electronic device 300. According to various embodiments of the disclosure, the communication module 760 may exchange feedback information associated with the content navigation model stored in the electronic device 300.

According to various embodiments of the disclosure, the electronic device 300 may produce a personalized content navigation model based on a global model obtained from the server 700. For example, in the initial state in which data is insufficient, such as when a product is just newly purchased or when the memory (e.g., the memory 130 of FIG. 1 or the memory 340 of FIG. 3) of the electronic device 300 is reset, the electronic device 300 may provide a content search function based on a global model obtained from the server 700, and subsequently, may produce a personalized content navigation model in a manner of applying analysis data associated with a content (or keyword) of the electronic device 300 to the global model. As another example, the electronic device 300 may obtain, from the server 700, data that has been used for producing a global model. For example, the electronic device 300 may obtain data that requires calculation, such as similarity between contents (or keywords) from the server 700, and utilize the same to produce a content navigation model, thereby reducing a burden of a complex operation that may occur in the process of producing the content navigation model. The electronic device 300 may obtain, from the server 700, operation data associated with a content that was produced not so long ago or a content that is hardly used, or information associated with another content (that is not stored in the electronic device 300) associate with a category (or a keyword) that a user selects in the content search process, and may utilize the same to produce and manage the content navigation model.

Figure 8:
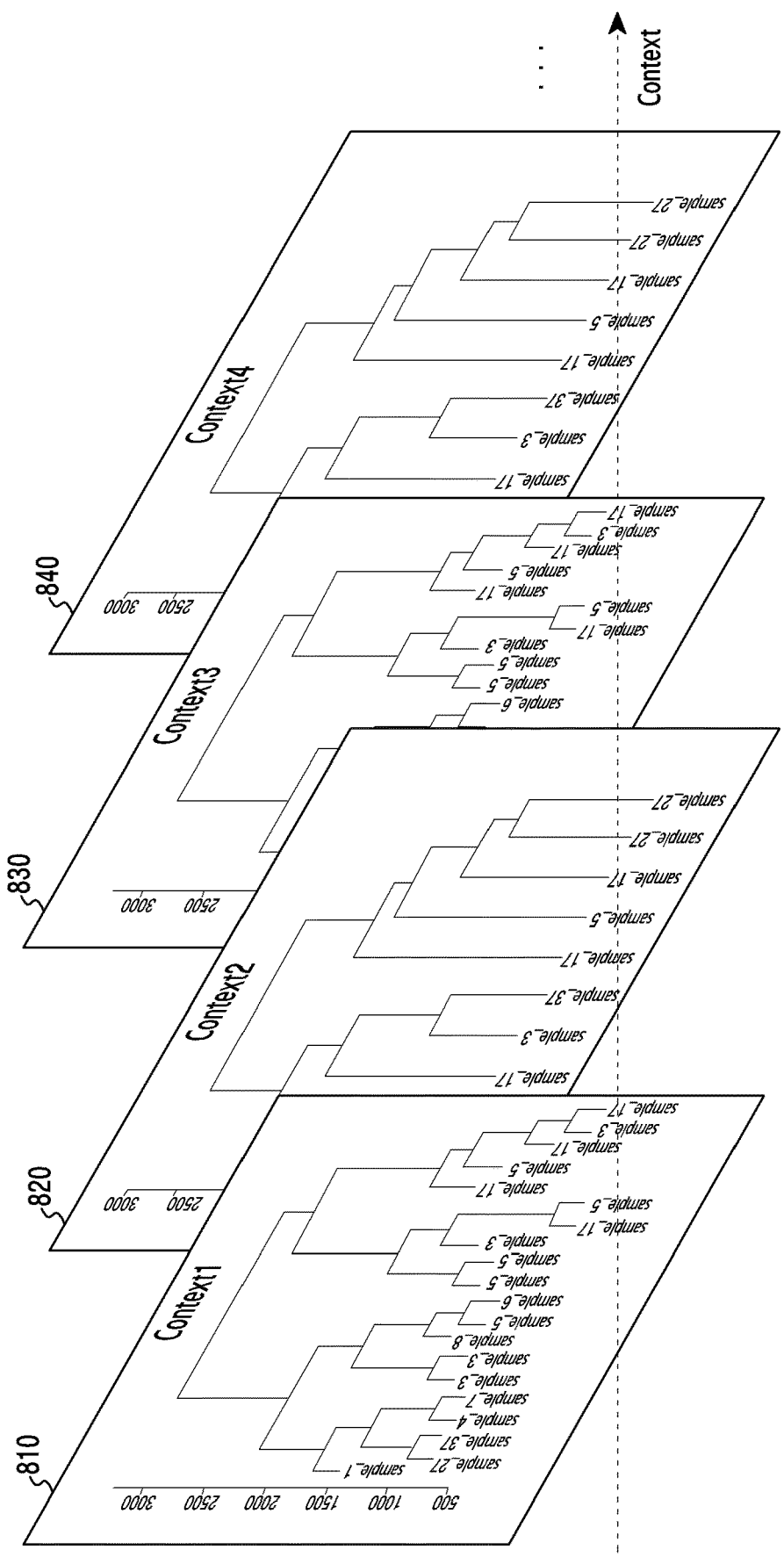
FIG. 8 is a diagram illustrating a scheme of producing a content navigation model differently for each context according to an embodiment of the disclosure.

FIG. 8 is a diagram illustrating a scheme of producing a content navigation model differently for each context according to an embodiment of the disclosure.

Referring to FIG. 8, according to various embodiments of the disclosure, in order to provide a customized search result suitable for the situation at the point in time of searching for a content, the electronic device 300 may produce a content navigation model different for each of various contexts. For example, the context may include at least one of a location, a season, a date, a time, or weather, and a combination of many contexts may be considered as a single context.

According to an embodiment of the disclosure, the electronic device 300 may produce a content navigation model 810 corresponding to context 1 by setting a weight value for at least one keyword related to a predetermined context or for a keyword related to a content having a search history (or a usage history) in the predetermine context. The electronic device 300 may assign a weight value to a keyword related to context 1 based on the frequency of search of a content used in context 1. For example, in the case that a context of 'pay day' is identified, the electronic device 300 may set a weight value for a related keyword, such as 'remittance', 'living costs', 'bank', 'loan', 'repayment' or the like based on a search history (or usage history) in the corresponding context, thereby increasing similarity (degree of association) between contents related to the keywords. According to various embodiments of the disclosure, the electronic device 300 may produce the content navigation model 810 associated with a predetermined context by utilizing a weight apply scheme, such as term frequency-inverse document frequency (TF-IDF).

According to an embodiment of the disclosure, the electronic device 300 may calculate similarity between contents using a cosine similarity as given in Equation 2 below in the process of producing a content navigation model for a predetermined context.

$$S(a, b) = \frac{\sum_{i=1}^{n} w_i a_i b_i}{\sqrt{\sum_{i=1}^{n} w_i a_i^2} \times \sqrt{\sum_{i=1}^{n} w_i b_i^2}}$$ Equation 2

In Equation 2, each of a and b denotes a content, and S(a,b) denotes the similarity between content a and content b. $a_i$ denotes an $i^{th}$ keyword related to content a, $b_i$, denotes an $i^{th}$ keyword related to content b, and w denotes a weight value set for each keyword. The electronic device 300 may apply w having a relatively high value to a keyword having a high degree of association with the predetermined context, and the total sum of all the values of w applied to Equation 2 cannot exceed 1. In addition, the electronic device 300 may calculate similarity between contents using a text-based similarity calculation scheme such the Jaccard coefficient, a correlation coefficient, Hamming distance, or the like. According to various embodiments of the disclosure, the electronic device 300 may determine, based on the calculated similarity, a representative keyword for each category group classified in association with the corresponding context, and may determine a keyword having the highest degree of association with the corresponding context as a representative keyword.

According to various embodiments of the disclosure, the electronic device 300 may produce and manage content navigation models 820, 830 and 840 corresponding to contexts 2, 3, and 4, respectively, in the same manner as the case of context 1. Although FIG. 8 illustrates that content navigation models 810, 820, 830, and 840 are configured for different contexts respectively in one dimension along with one directional axis, the electronic device 300 according to various embodiments may extendedly implement the process of producing a content navigation in a manner that produces a content navigation model for each context for each cell in multi-dimensional space.

Figure 9:
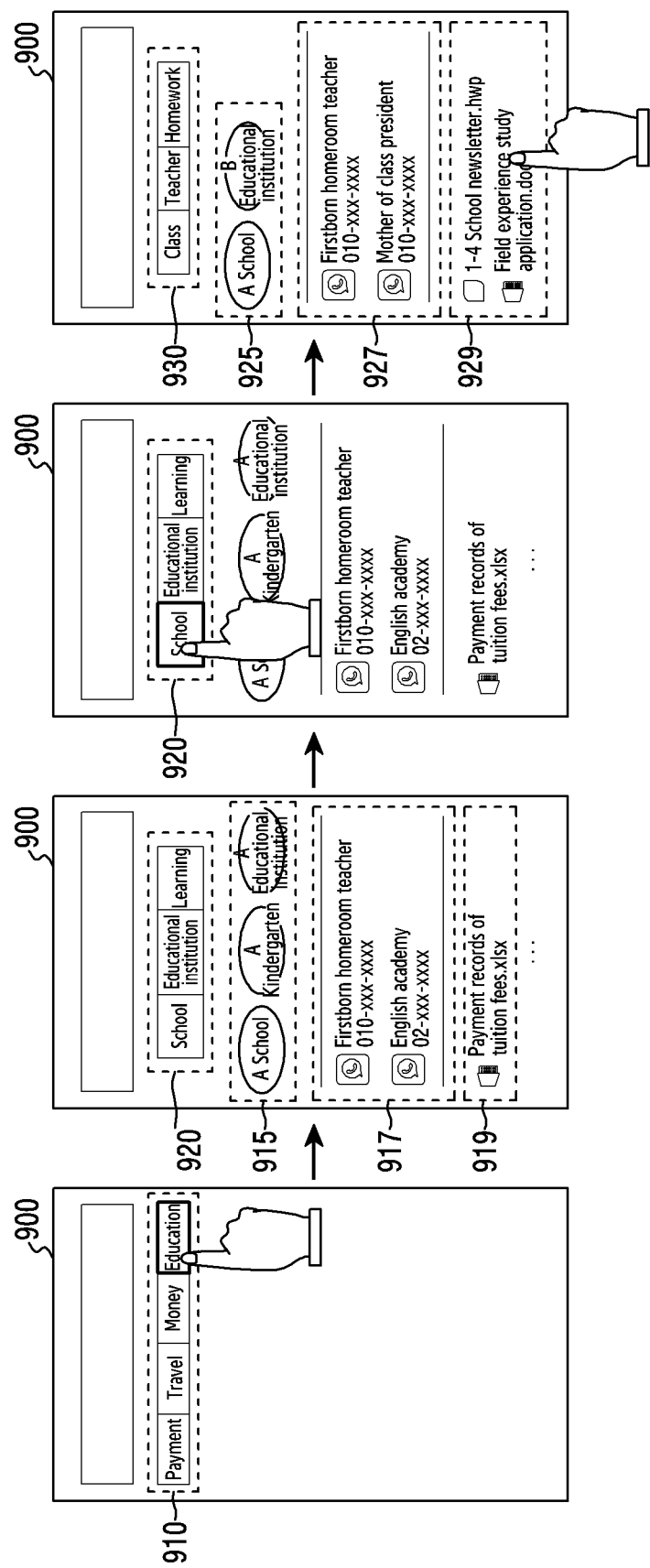
FIG. 9 is a diagram illustrating a process of searching for a content based on selection of a category by an electronic device according to an embodiment of the disclosure.

FIG. 9 is a diagram illustrating a process of searching for a content based on selection of a category by an electronic device according to an embodiment of the disclosure.

According to various embodiments of the disclosure, the electronic device 300 may initiate a content search process in response to a user touch input or voice command, or a designated gesture input, and may display a content search screen 900 on a display (e.g., the display module 160 of FIG. 1 or the display 310 of FIG. 3).

Referring to FIG. 9, the electronic device 300 may suggest one or more keywords 910 on the content search screen 900 at the initial stage. The one or more keywords 910 may correspond to representative keywords of groups classified as the uppermost category in a content navigation model (e.g., the content navigation model 500 of FIG. 5 or the content navigation model 810 of FIG. 8). For example, the electronic device 300 may display representative keywords of 4 groups classified as the uppermost category, that is, 'payment', 'travel', 'money', and 'education', on the content search screen 900.

According to an embodiment of the disclosure, the electronic device 300 may identify that 'education' is selected among the one or more keywords 910 suggested via the content search screen 900, and may identify one or more subordinate categories 920 associated with a group of 'education' and one or more contents 915, 917, and 919 from the content navigation model. The one or more subordinate categories 920 may correspond to representative keywords of at least some groups among groups classified as subordinate categories of keyword 'education'. For example, the electronic device 300 may display 'school', 'educational institution', or 'learning' as subordinate categories of the keyword 'education', and may display one or more applications 915, one or more pieces of contact information 917, or one or more document files 919 on the content search screen 900 as contents associated with 'education'. In this instance, the electronic device 300 may distinguish one or more contents 915, 917, and 919 based on the type of content and may display the same. According to various embodiments of the disclosure, the electronic device 300 may arrange one or more contents in order of high similarity to a corresponding category and may display the same on the content search screen 900. According to various embodiments of the disclosure, the electronic device 300 may limit the number of subordinate categories and contents to be displayed on the content search screen 900. For example, based on the number of items capable of being displayed set by a user, the electronic device 300 may select and display a predetermined number of categories and/or contents among the identified one or more subordinate categories and one or more contents. The electronic device 300 may select the predetermined number of categories and/or contents according to at least one criterion among similarity to the selected keyword, the frequency of search, or a content production time.

According to an embodiment of the disclosure, the electronic device 300 may identify that 'school' is selected among the one or more subordinate categories 920 suggested via the content search screen 900, and may identify one or more subordinate categories 930 associated with a group of 'school' and one or more contents 925, 927, and 929 from the content navigation model. The one or more subordinate categories 930 may correspond to representative keywords of at least some groups among groups classified as subordinate categories of the group 'school'. For example, the electronic device 300 may display 'class', 'teacher', or 'homework' as subordinate categories of the group 'school', and may display one or more applications 925, one or more pieces of contact information 927, or one or more document files 929 on the content search screen 900 as contents associated with 'school'.

According to an embodiment of the disclosure, the electronic device 300 may identify that a document file of 'field experience study application.docx' is selected among one or more contents 925, 927, and 929 suggested via the content search screen 900, and may open the selected document file and provide the same via the display 310. As described above, the electronic device 300 may suggest a category and a content corresponding to a keyword selected by a user in stages, and thus may provide guidance so that the user easily and quickly accesses a desired content.

Figure 10:
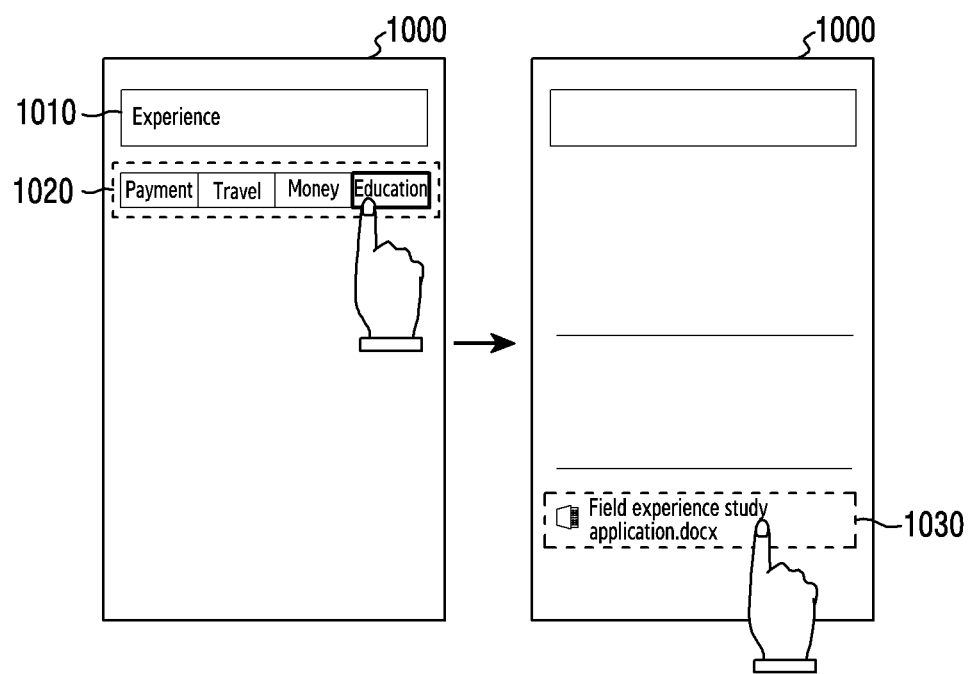
FIG. 10 is a diagram illustrating a process of searching for a content based on input of a search word and selection of a category by an electronic device according to an embodiment of the disclosure.

FIG. 10 is a diagram illustrating a process of searching for a content based on input of a search word and selection of a category by an electronic device according to an embodiment of the disclosure. According to various embodiments of the disclosure, the electronic device 300 may provide a content search scheme that utilizes input of a search word and selection of a keyword (category) together.

Referring to FIG. 10, the electronic device 300 may initiate a content search process in response to a user touch input or voice command, or a designated gesture input, and may display a content search screen 1000 on a display (e.g., the display module 160 of FIG. 1 or the display 310 of FIG. 3). In FIG. 10, the content search screen 1000 may include a search word input field 1010 for receiving input of a search word and one or more keywords 1020. The one or more keywords 1020 may correspond to representative keywords of groups classified as the uppermost category in a content navigation model (e.g., the content navigation model 500 of FIG. 5 or the content navigation model 810 of FIG. 8).

According to an embodiment of the disclosure, in the state in which a search word is input into the search word input field 1010, the electronic device 300 may identify a selection input to one of the one or more keywords 1020. For example, in the state in which a search word of 'experience' is input by a user into the search word input field 1010, the electronic device 300 may identify that 'education' is selected among the one or more keywords 1020. The electronic device 300 may directly search for a document file 1030 of 'field experience study application.docx' as a content that satisfies both the input search word and the selected keyword based on the content navigation model, and may provide the same via the display 310. As illustrated in FIG. 10, in the case that input of a search word and selection of a keyword are utilized together, a content search process may immediately perform searching without suggesting a category and a content in stages, thereby quickly providing a content desired by a user.

Figure 11:
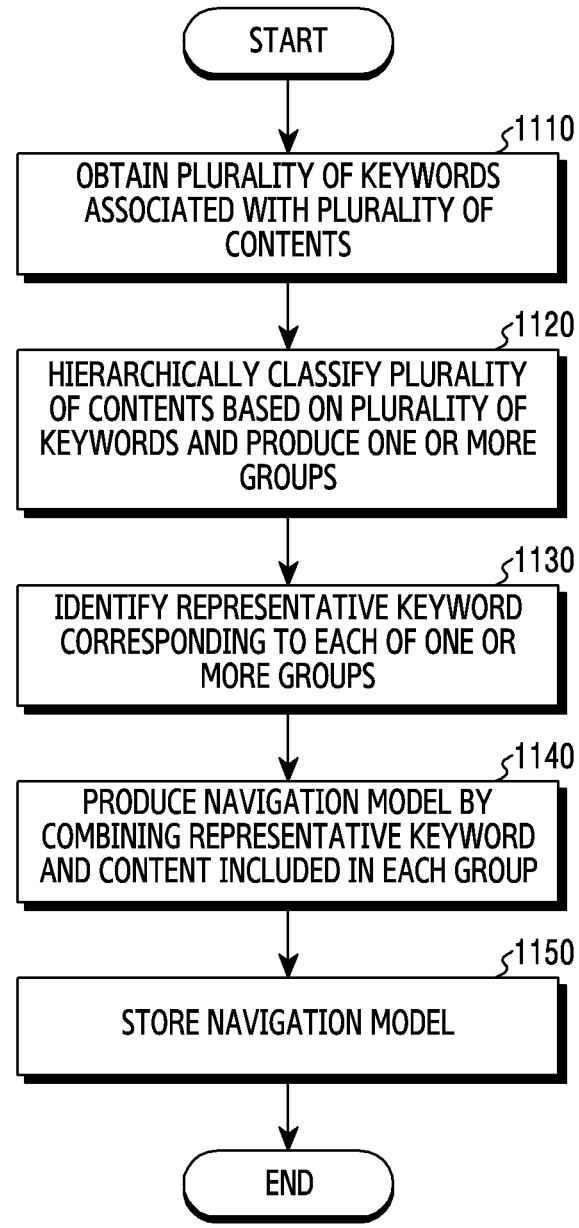
FIG. 11 is a flowchart illustrating a method of operating an electronic device according to an embodiment of the disclosure.

FIG. 11 is a flowchart illustrating a method of operating an electronic device according to an embodiment of the disclosure. According to an embodiment of the disclosure, the electronic device 300 is a device for producing a content navigation model to manage a plurality of contents stored in the electronic device 300 by hierarchically grouping the plurality of contents based on one or more related keyword, and may correspond to the electronic device 101 of FIG. 1 or the electronic device 300 of FIG. 3. The operations of FIG. 11 may be performed by at least one processor included in the electronic device 300 (e.g., the processor 120 of FIG. 1 or at least one processor 330 of FIG. 3).

Referring to FIG. 11, in operation 1110, the electronic device 300 may obtain a plurality of keywords associated with a plurality of contents stored in a memory (e.g., the memory 130 of FIG. 1 or the memory 340 of FIG. 3). The plurality of keywords may be obtained using at least one of the name (e.g., a file name, an application name) or the type of each content, related information (e.g., a category, metadata or tag data), or the contents included in a content. For example, the electronic device 300 may identify information associated with the plurality of contents from one or more databases accessible by the memory 340 or the electronic device 300, and may extract the plurality of keywords based on the identified information associated with the plurality of contents. As another example, the electronic device 300 may obtain information associated with the plurality of contents from an external server via a communication module (e.g., the communication module 190 of FIG. 1 or the communication module 340 of FIG. 3), or may obtain a recommended keyword associated with the plurality of contents.

According to an embodiment of the disclosure, in operation 1120, the electronic device 300 may hierarchically classify the plurality of contents based on the plurality of keywords, and may produce one or more groups. For example, the electronic device 300 may classify the plurality of contents in the form of a hierarchical tree structure using a hierarchical clustering scheme, and may produce one or more groups based on a classification result.

According to an embodiment of the disclosure, in operation 1130, the electronic device 300 may identify representative keywords corresponding to the one or more produced groups. A representative keyword for each group may correspond to a category corresponding to each of the one or more groups produced according to the classification result. According to various embodiments of the disclosure, the electronic device 300 may determine a representative keyword for each group based on at least one of an average similarity between contents included in each of the one or more groups, a keyword type, or a search history. For example, the electronic device 300 may calculate similarity between contents associated with each group, and may determine a keyword of a content having the highest average value of the calculated similarities as a representative keyword of the corresponding group. The similarity between contents may be measured using at least one text-based similarity calculation scheme among a cosine similarity, the Jaccard coefficient, a correlation coefficient, or Hamming distance. As another example, the electronic device 300 may set a weight value for each of source data associated with keywords included in each group, and may calculate a keyword score based on the set weight value. The electronic device 300 may determine a keyword having the highest calculated keyword score as the representative keyword. As another example, the electronic device 300 may identify the frequency of use of the keywords included in each group, and may determine a keyword having the highest frequency of use as the representative keyword.

According to an embodiment of the disclosure, in operation 1140, the electronic device 300 may produce a navigation model by combining a representative keyword identified for each group and a content belonging to each group. For example, the electronic device 300 may produce a navigation model in a hierarchical tree structure by associating the plurality of contents with the representative keyword for each group so as to correspond to one or more groups produced based on hierarchical clustering. According to the structure of the navigation model, each content is not specified for a single keyword, and may be overlappingly connected to one or more keywords according to an associated with one or more categories. Accordingly, the probability that a user will access a desired content is increased.

According to various embodiment of the disclosure, to provide a customized search result suitable for the situation at the point in time of searching for a content, the electronic device 300 may produce a plurality of content navigation models in real time based on a user profile or context information or may produce a content navigation model in advance for each of the various contexts. For example, the electronic device 300 may identify context information associated with a user, and may set a weight value for at least one keyword related to the identified context information. The context information may include at least one of a location, a season, a date, a time, or weather. For example, in the case that a user desires to search for a predetermined content while the user is located in an amusement park, the electronic device 300 may identify a context of 'amusement park', and may set a weight value for a keyword related to the context of 'amusement park' or a weight value for a keyword related to a content having a usage history in the corresponding context so that the user is capable of quickly accessing an application related to an amusement park or surrounding facilities related information. The electronic device 300 may determine a representative keyword for each group based on the set weight value, and may produce a navigation model corresponding to the context information based on the determined representative keyword for each group.

According to an embodiment of the disclosure, in operation 1150, the electronic device 300 may store the produced navigation model in a database that the memory 340 or the electronic device 300 is capable of accessing. According to various embodiments of the disclosure, the electronic device 300 may update the navigation model every time a content is stored. For example, in the case that a new content is identified as being stored in the memory 340, the at least one processor 330 may obtain at least one keyword associated with the new content, and may update the navigation model in a manner that applies the new content to the existing navigation model by utilizing an incremental clustering scheme.

Figure 12:
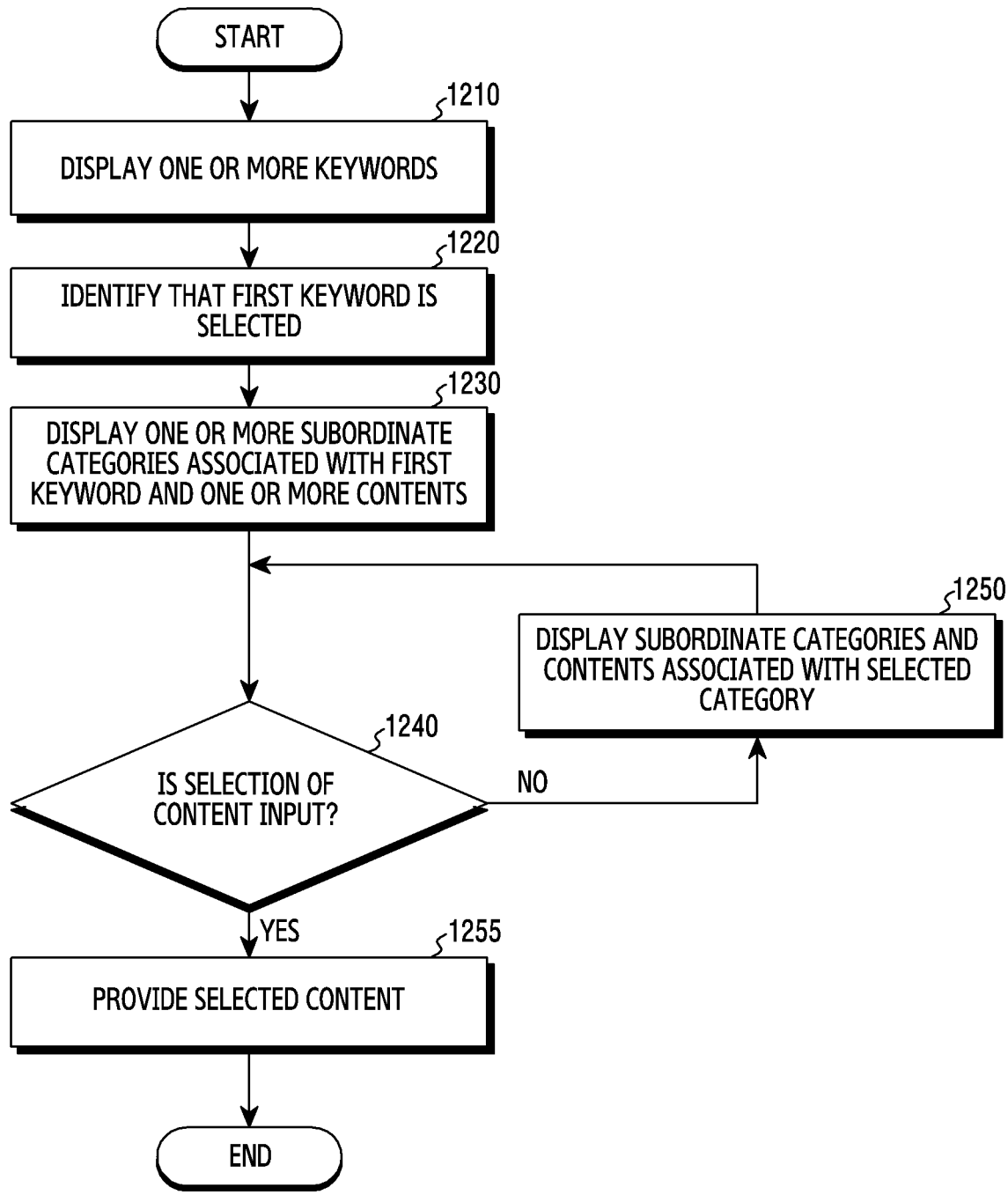
FIG. 12 is a flowchart illustrating a method of operating an electronic device according to an embodiment of the disclosure.

FIG. 12 is a flowchart illustrating a method of operating an electronic device according to an embodiment of the disclosure. According to an embodiment of the disclosure, the electronic device 300 is a device that provides, in stages based on a content navigation model, a path that accesses a content that a user desired to retrieve in the process of searching for a predetermined content stored in the electronic device 300, and may correspond to the electronic device 101 of FIG. 1 or the electronic device 300 of FIG. 3. The operations of FIG. 12 may be performed by at least one processor included in the electronic device 300 (e.g., the processor 120 of FIG. 1 or at least one processor 330 of FIG. 3).

Referring to FIG. 12, in operation 1210, the electronic device 300 may display one or more keywords for searching for a content on a display (e.g., the display module 160 of FIG. 1 or the display 310 of FIG. 3). The one or more keywords may correspond to representative keywords of groups classified as the uppermost category in the content navigation model. In response to a designated gesture input from a user, the electronic device 300 may display the one or more keywords on the display 310. For example, in the case that a user touch input or voice command to call a content search screen is identified as being input, the electronic device 300 may display the one or more keywords on the display 310. As another example, in the case that a designated action for searching for a content is identified as being performed, the electronic device 300 may suggest the one or more keywords via the display 310.

According to an embodiment of the disclosure, in operation 1220, the electronic device 300 may identify that a first keyword is selected among the one or more keywords displayed on the display 310. In operation 1220, the electronic device 300 may identify that the first keyword is selected based on a user touch input or voice input to the first keyword.

According to an embodiment of the disclosure, in operation 1230, the electronic device 300 may display, on the display 310, one or more first categories among subordinate categories associated with the first keyword and one or more first contents associated with the first keyword. The one or more first categories may correspond to at least some of the subordinate categories of the first keyword, and a representative keyword for each group classified as a subordinate category of the first keyword in the content navigation model may be displayed the as one or more first categories. The one or more first contents may include a content belonging to a group corresponding to the first keyword. For example, in response to identifying that a keyword of 'travel' is selected among the one or more keywords, the electronic device 300 may display, on the display 310, and a category of 'flight', 'map', 'food', or 'accommodation' and one or more contents associated with 'travel'. According to various embodiments of the disclosure, the electronic device 300 may identify content display related setting information in operation 1230. For example, the electronic device 300 may identify, based on the setting information, the number of items capable of being displayed, and may limit the number of one or more first categories and the one or more first contents to the number of items capable of being displayed. In this instance, according to at least one criterion among similarity to the first keyword, the frequency of search, or content production time, the electronic device 300 may select first categories and first contents, the number of each of which corresponds to the number of items capable of being displayed, and may display the same on the display 310. The at least one criterion may be applied differently according to a content usage pattern of a user.

According to an embodiment of the disclosure, in operation 1240, the electronic device 300 may identify whether selection of one of the one or more first contents displayed on the display 310 is input. For example, based on a user touch input or voice input, or other designated gesture inputs, the electronic device 300 may identify which of the items is selected among the one or more first categories or the one or more first contents. In the case that the result of the determination shows that one of the one or more first contents is not selected (No in operation 1240), the electronic device 300 may identify a selection into to one of the one or more first categories, and may display one or more second categories among subordinate categories associated with the selected category and one or more second contents associated with the selected category on the display 310 in operation 1250. The one or more second categories may correspond to at least some of the subordinate categories of the first category, and a representative keyword for each group classified as a subordinate category of the selected category in the content navigation model may be displayed as the one or more second categories. The one or more second contents may include a content belonging to a group of the selected category. The electronic device 300 may display the one or more second categories and one or more second contents in the same manner of displaying the one or more first categories and the one or more first contents. In the case that one of the one or more first categories is identified as being selected, the electronic device 300 may identify the number of items capable of being displayed according to the setting information, may select and arrange second categories and second contents, the number of each of which corresponds to the number of items capable of being displayed, according to at least one criterion among similarity to a representative keyword of the selected category, the frequency of search, a content production time, and may display the same on the display 310. According to various embodiments of the disclosure, the electronic device 300 may identify a selection input with respect to the one or more second categories or the one or more second contents. Based on a user touch input or voice input, or other designated gesture inputs, the electronic device 300 may identify which of the items is selected among the one or more second categories or the one or more second contents. For example, in the case that a selection input to one of the one or more second contents is identified, the electronic device 300 may provide the selected content via the display 310. As another example, in the case that a selection input to one of the one or more second categories is identified, the electronic device 300 may display one or more categories associated with the selected category and one or more contents on the display 310. The electronic device 300 may identify one or more subordinate categories associated with the selected category and one or more contents, and may display the same on the display 310 until selection of any one of the contents displayed on the display 310 is input.

In the case that the result of the identification shows that one of the one or more first contents is selected (Yes in operation 1240), the electronic device 300 may provide the selected content via the display 310 in operation 1255. In response to the selection of the content, the electronic device 300 may identify an application or a program needed for providing the content, may execute the same, and may provide the selected content.

An electronic device (e.g., the electronic device 300) according to an embodiment may include a display (e.g., the display 310), a communication module (e.g., the communication module 320), at least one processor (e.g., the processor 330) operatively connected to the display and the communication module, and a memory (e.g., the memory 340) operatively connected to the at least one processor, and the memory stores instructions which, when executed, cause the at least one processor to display, on the display, one or more keywords for searching for a content, to arrange and display, according to a designated criterion, one or more first categories among subordinate categories associated with a first keyword and one or more first contents associated with the first keyword, in response to identifying that the first keyword is selected among the one or more keywords, to arrange and display, according to the designated criterion, one or more second categories among subordinate categories associated with a selected category and one or more second contents associated with the selected category, in the case that a selection input to one of the one or more first categories is identified, and to provide a selected content in the case that a selection input to one of the one or more first contents is identified.

According to an embodiment of the disclosure, the instructions may cause the at least one processor to identify setting information associated with the number of items capable of being displayed, in the case in which selection of the first keyword is input, and to display, based on the setting information, the one or more first categories and the one or more first contents.

According to an embodiment of the disclosure, the instructions may cause the at least one processor to arrange and display the one or more first categories and the one or more first contents according to the designated criterion including at least one of similarity to the first keyword, a frequency of search, or a content production time.

According to an embodiment of the disclosure, the instructions may cause the at least one processor to provide a selected content in the case that a selection input to one of the one or more second contents is identified, and, in the case that a selection input to one of the one or more second categories is identified, to identify and display one or more subordinate categories associated with the selected category and one or more contents until selection of any one of the contents is input.

According to an embodiment of the disclosure, the instructions may cause the at least one processor to identify context information associated with the point in time of selecting the first keyword, and to determine and display, based on the identified context information, the one or more first categories and the one or more first contents, and the context information may include at least one of a location, a season, a date, a time, or weather.

An electronic device (e.g., the electronic device 300) according to various embodiments may include a communication module (e.g., the communication module 320), at least one processor (e.g., the processor 330) operatively connected to the communication module, a memory (e.g., the memory 340) storing a plurality of contents, and operatively connected to the at least one processor, and the memory may store instructions which, when executed, cause the at least one processor to obtain a plurality of keywords associated with the plurality of contents, to hierarchically classify the plurality of contents based on the plurality of obtained keywords, so as to produce one or more groups, to identify a representative keyword corresponding to each of the one or more groups, to combine the identified representative keyword and a content included in each of the one or more groups so as to produce a navigation model, and to store the produced navigation model.

According to an embodiment of the disclosure, the instructions may cause the at least one processor to identify information associated with the plurality of contents from one or more databases (e.g., the content/keyword DB 435) accessible by the memory or the electronic device, and to extract the plurality of keywords based on information associated with the plurality of contents.

According to an embodiment of the disclosure, the instructions may cause the at least one processor to obtain the plurality of keywords from an external server using the communication module.

According to an embodiment of the disclosure, the instructions may cause the at least one processor to classify the plurality of contents using a hierarchical clustering scheme.

According to an embodiment of the disclosure, the instructions may cause the at least one processor to determine the representative keyword based on at least one of an average similarity between contents included in each of the one or more groups, a keyword type, or a search history.

According to an embodiment of the disclosure, the instructions may cause the at least one processor to identify context information associated with a user of the electronic device, to set a weight value for at least one keyword related to the identified context information, to determine, based on the set weight value, a representative keyword corresponding to each of the one or more groups, and to store a first model produced based on the determined representative keyword as a navigation model corresponding to the context information.

According to an embodiment of the disclosure, the instructions may cause the at least one processor to obtain at least one keyword associated with a new content in the case that the new content is identified as being stored in the memory, and to update the navigation model using an incremental clustering scheme.

An electronic device (e.g., the electronic device 300) according to various embodiments of the disclosure may include an operation of displaying, on a display, one or more keywords for searching for a content, an operation of arranging and displaying, according to a designated criterion, one or more first categories among subordinate categories associated with a first keyword and one or more first contents associated with the first keyword, in response to identifying that the first keyword is selected among the one or more keywords, an operation of arranging and displaying, according to the designated criterion, one or more second categories among the subordinate categories associated with a selected category and one or more second contents associated with the selected category in the case that a selection input to one of the one or more first categories is identified, and an operation of providing a selected content in the case that a selection input to one of the one or more first contents is identified.

According to an embodiment of the disclosure, the operation of displaying the one or more first categories and the one or more first content may include an operation of identifying setting information associated with the number of items capable of being displayed, in the case that selection of the first keyword is input, and an operation of arranging and displaying the one or more first categories and the one or more first contents according to the designated criterion based on the setting information, and the designated criterion may include at least one of similarity to the first keyword, a frequency of search, or a content production time.

According to an embodiment of the disclosure, the operation of displaying the one or more first categories and the one or more first contents may include an operation of identifying context information associated with the point in time of selecting the first keyword, and an operation of determining and displaying, based on the identified context information, the one or more first categories and the one or more first contents, and the context information may include at least one of a location, a season, a date, a time, or weather.

According to an embodiment of the disclosure, the operation of displaying the one or more second categories and the one or more second contents may include an operation of providing a selected content in the case that a selection input to one of the one or more second contents is identified, and an operation of identifying and displaying one or more subordinate categories associated with a selected category and one or more contents until selection of any one content is input, in the case that a selection input to one of the one or more second categories is identified.

A method of operating an electronic device (e.g., the electronic device 300) according to another embodiment may include an operation of obtaining a plurality of keywords associated with a plurality of contents stored in the electronic device, an operation of hierarchically classifying the plurality of contents based on the plurality of obtained keywords, so as to produce one or more groups, an operation of identifying a representative keyword corresponding to each of the one or more groups, an operation of combining the identified representative keyword and a content included in each of the one or more groups, and producing a navigation model, and an operation of storing the produced navigation model.

According to an embodiment of the disclosure, the operation obtaining of the plurality of keywords may include an operation of extracting a plurality of keywords based on information associated with the plurality of contents identified from one or more databases (e.g., the content/keyword DB 435)) accessible by the memory (e.g., the memory 340) of the electronic device or the electronic device or an operation of obtaining the plurality of keywords from an external server using a communication module (e.g., the communication module 320) of the electronic device.

According to an embodiment of the disclosure, the operation of producing the one or more groups may include an operation of hierarchically classifying the plurality of contents using a hierarchical clustering scheme.

According to an embodiment of the disclosure, the operation of identifying the representative keyword may include an operation of determining the representative keyword based on at least one of an average similarity between contents included in each of the one or more groups, a keyword type, or a search history.

According to an embodiment of the disclosure, the method may further include an operation of identifying context information associated with a user of the electronic device, an operation of setting a weight value for at least one keyword related to the identified context information, an operation of determining, based on the set weight value, a representative keyword corresponding to each of the one or more groups, and an operation of storing a first model produced based on the determined representative keyword as a navigation model corresponding to the context information.

According to an embodiment of the disclosure, the method may further include an operation of obtaining at least one keyword associated with a new content in the case that the new content is identified as being stored in the electronic device, and an operation of updating the navigation model using an incremental clustering scheme.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a communication module;
   at least one processor operatively connected to the display and the communication module; and
   a memory operatively connected to the at least one processor,
   wherein the memory stores instructions which, when executed, cause the at least one processor to:
   display, on the display, one or more keywords for searching for a content,
   in response to identifying that a first keyword is selected among the one or more keywords, arrange and display, according to a designated criterion, one or more first categories among subordinate categories associated with the first keyword and one or more first contents associated with the first keyword,
   in case that a selection input to one of the one or more first categories is identified, arrange and display, according to the designated criterion, one or more second categories among subordinate categories associated with a selected category and one or more second contents associated with the selected category, and
   in case that a selection input to one of the one or more first contents is identified, provide the selected content.

2. The electronic device of claim 1, wherein the instructions further cause the at least one processor to:
   in a case in which selection of the first keyword is input, identify setting information associated with a number of items capable of being displayed, and
   based on the setting information, display the one or more first categories and the one or more first contents.

3. The electronic device of claim 2, wherein the instructions further cause the at least one processor to arrange and display the one or more first categories and the one or more first contents according to the designated criterion including at least one of similarity to the first keyword, a frequency of search, or a content production time.

4. The electronic device of claim 1, wherein the instructions further cause the at least one processor to:
   in case that a selection input to one of the one or more second contents is identified, provide the selected content, and
   in case that a selection input to one of the one or more second categories is identified, identify and display one or more subordinate categories associated with the selected category and one or more contents until selection of any one of the contents is input.

5. The electronic device of claim 1, wherein the instructions further cause the at least one processor to:
identify context information associated with a point in time of selecting the first keyword, and
determine and display, based on the identified context information, the one or more first categories and the one or more first contents,
wherein the context information comprises at least one of a location, a season, a date, a time, or weather.

6. An electronic device comprising:
a communication module;
at least one processor operatively connected to the communication module; and
a memory storing a plurality of contents, and operatively connected to the at least one processor,
wherein the memory stores instructions which, when executed, cause the at least one processor to:
obtain a plurality of keywords associated with the plurality of contents,
hierarchically classify the plurality of contents based on the plurality of obtained keywords, so as to produce one or more groups,
identify a representative keyword corresponding to each of the one or more groups,
combine the identified representative keyword and a content included in each of the one or more groups, so as to produce a navigation model, and
store the produced navigation model.

7. The electronic device of claim 6, wherein the instructions further cause the at least one processor to:
identify information associated with the plurality of contents from one or more databases accessible by the memory or the electronic device; and
extract the plurality of keywords based on the information associated with the plurality of contents.

8. The electronic device of claim 6, wherein the instructions further cause the at least one processor to obtain the plurality of keywords from an external server using the communication module.

9. The electronic device of claim 6, wherein the instructions further cause the at least one processor to classify the plurality of contents using a hierarchical clustering scheme.

10. The electronic device of claim 6, wherein the instructions further cause the at least one processor to determine the representative keyword based on at least one of an average similarity between contents included in each of the one or more groups, a keyword type, or a search history.

11. The electronic device of claim 6, wherein the instructions further cause the at least one processor to:
identify context information associated with a user of the electronic device,
set a weight value for at least one keyword related to the identified context information,
determine, based on the set weight value, a representative keyword corresponding to each of the one or more groups, and
store a first model produced based on the determined representative keyword as a navigation model corresponding to the context information.

12. The electronic device of claim 6, wherein the instructions further cause the at least one processor to:
in case that a new content is identified as being stored in the memory, obtain at least one keyword associated with the new content, and
update the navigation model using an incremental clustering scheme.

13. A method of operating an electronic device, the method comprising:
displaying, on a display, one or more keywords for searching for a content;
in response to identifying that a first keyword is selected among the one or more keywords, arranging and displaying, according to a designated criterion, one or more first categories among subordinate categories associated with the first keyword and one or more first contents associated with the first keyword;
in case that a selection input to one of the one or more first categories is identified, arranging and displaying, according to the designated criterion, one or more second categories among the subordinate categories associated with a selected category and one or more second contents associated with the selected category; and
in case that a selection input to one of the one or more first contents is identified, providing the selected content.

14. The method of claim 13, wherein the displaying of the one or more first categories and the one or more first contents comprises:
in case that selection of the first keyword is input, identifying setting information associated with a number of items capable of being displayed; and
arranging and displaying the one or more first categories and the one or more first contents according to the designated criterion based on the setting information,
wherein the designated criterion comprises at least one of similarity to the first keyword, a frequency of search, or a content production time.

15. The method of claim 13, wherein the displaying of the one or more first categories and the one or more first contents comprises:
identifying context information associated with a point in time of selecting the first keyword; and
determining and displaying, based on the identified context information, the one or more first categories and the one or more first contents,
wherein the context information comprises at least one of a location, a season, a date, a time, or weather.

16. The method of claim 13, wherein the displaying of the one or more second categories and the one or more second contents comprises:
in case that a selection input to one of the one or more second contents is identified, providing the selected content; and
in case that a selection input to one of the one or more second categories is identified, identifying and displaying one or more subordinate categories associated with the selected category and one or more contents until selection of any one content is input.

17. A method of operating an electronic device, the method comprising:
obtaining a plurality of keywords associated with a plurality of contents stored in the electronic device;
hierarchically classifying the plurality of contents based on the plurality of obtained keywords, and producing one or more groups;
identifying a representative keyword corresponding to each of the one or more groups;
combining the identified representative keyword and a content included in each of the one or more groups, and producing a navigation model; and
storing the produced navigation model.

18. The method of claim 17, wherein the obtaining of the plurality of keywords comprises:
- extracting the plurality of keywords based on information associated with the plurality of contents identified from one or more databases accessible by a memory of the electronic device or the electronic device; or
- obtaining the plurality of keywords from an external server using a communication module of the electronic device.

19. The method of claim 17, wherein the producing of the one or more groups comprises hierarchically classifying the plurality of contents using a hierarchical clustering scheme.

20. The method of claim 17, wherein the identifying of the representative keyword comprises determining the representative keyword based on at least one of an average similarity between contents included in each of the one or more groups, a keyword type, or a search history.

21. The method of claim 17, further comprising:
- identifying context information associated with a user of the electronic device;
- setting a weight value for at least one keyword related to the identified context information;
- determining, based on the set weight value, a representative keyword corresponding to each of the one or more groups; and
- storing a first model produced based on the determined representative keyword as a navigation model corresponding to the context information.

22. The method of claim 17, further comprising:
- in case that a new content is identified as being stored in the electronic device, obtaining at least one keyword associated with the new content; and
- updating the navigation model using an incremental clustering scheme.

\* \* \* \* \*